US012247729B2

(12) United States Patent
Harvey et al.

(10) Patent No.: US 12,247,729 B2
(45) Date of Patent: Mar. 11, 2025

(54) LIGHT

(71) Applicant: MILWAUKEE ELECTRIC TOOL CORPORATION, Brookfield, WI (US)

(72) Inventors: Kyle Harvey, West Allis, WI (US); Ross McIntyre, Milwaukee, WI (US); David Proeber, Milwaukee, WI (US); Jason Isaacs, Milwaukee, WI (US); Joshua Schermerhorn, Wauwatosa, WI (US); Brian Cornell, West Allis, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/367,594

(22) Filed: Sep. 13, 2023

(65) Prior Publication Data

US 2024/0003530 A1 Jan. 4, 2024

Related U.S. Application Data

(60) Continuation of application No. 17/979,274, filed on Nov. 2, 2022, now Pat. No. 11,796,166, which is a (Continued)

(51) Int. Cl.
*F21V 29/70* (2015.01)
*F21L 4/00* (2006.01)
(Continued)

(52) U.S. Cl.
CPC ................ *F21V 29/83* (2015.01); *F21L 4/00* (2013.01); *F21L 4/08* (2013.01); *F21L 14/00* (2013.01);
(Continued)

(58) Field of Classification Search
CPC ................................ F21V 29/70; F21V 29/78
(Continued)

(56) References Cited

U.S. PATENT DOCUMENTS 3,331,958 A 7/1967 Adler
4,032,771 A 6/1977 Ilzig
(Continued)

FOREIGN PATENT DOCUMENTS

AU 2013101143 A4 9/2013
CN 2379702 Y 5/2000
(Continued)

OTHER PUBLICATIONS

International Search Report and Written Opinion for Application No. PCT/US2016/016602 dated May 10, 2016 (13 pages).
(Continued)

*Primary Examiner* — Toan C Ly
(74) *Attorney, Agent, or Firm* — Michael Best & Friedrich LLP

(57) ABSTRACT

A light including a housing having an upper portion, a lower portion, and a central axis. The lower portion defines a battery port. The upper portion acts as a lens. The light further includes a heat sink extending upward from the lower portion of the housing and including a body defining a central aperture. A plurality of light support surfaces are arranged around a perimeter of the body and a top support member is coupled to and oriented perpendicularly relative to the plurality of light support surfaces. The light further includes a first plurality of LEDs coupled to the plurality of light support surfaces and a second plurality of LEDs supported on the top support member. The light further includes a first battery pack and a second battery pack, both of which are electrically connected to the first and second pluralities of LEDs when received in the battery port.

20 Claims, 38 Drawing Sheets

Related U.S. Application Data division of application No. 17/853,297, filed on Jun. 29, 2022, now Pat. No. 11,536,444, which is a division of application No. 17/683,628, filed on Mar. 1, 2022, now Pat. No. 11,408,605, which is a continuation of application No. 16/815,176, filed on Mar. 11, 2020, now Pat. No. 11,415,310, which is a continuation of application No. 16/290,252, filed on Mar. 1, 2019, now Pat. No. 10,627,100, which is a continuation of application No. 16/056,602, filed on Aug. 7, 2018, now Pat. No. 10,386,057, which is a continuation of application No. 15/851,013, filed on Dec. 21, 2017, now Pat. No. 10,066,827, which is a continuation of application No. 15/015,794, filed on Feb. 4, 2016, now Pat. No. 9,851,088.

(60) Provisional application No. 62/265,935, filed on Dec. 10, 2015, provisional application No. 62/111,990, filed on Feb. 4, 2015.

(51) Int. Cl.

| | |
|---|---|
| ***F21L 4/08*** | (2006.01) |
| ***F21L 14/00*** | (2006.01) |
| ***F21S 9/02*** | (2006.01) |
| ***F21V 23/00*** | (2015.01) |
| ***F21V 23/04*** | (2006.01) |
| ***F21V 23/06*** | (2006.01) |
| ***F21V 29/78*** | (2015.01) |
| ***F21V 29/83*** | (2015.01) |
| *F21Y 101/00* | (2016.01) |
| *F21Y 107/00* | (2016.01) |
| *F21Y 115/10* | (2016.01) |

(52) U.S. Cl.
CPC .............. *F21S 9/02* (2013.01); *F21V 23/006* (2013.01); *F21V 23/0435* (2013.01); *F21V 23/06* (2013.01); *F21V 29/70* (2015.01); *F21V 29/78* (2015.01); *F21Y 2101/00* (2013.01); *F21Y 2107/00* (2016.08); *F21Y 2115/10* (2016.08)

(58) Field of Classification Search
USPC .......................................................... 362/190
See application file for complete search history.

(56) References Cited

U.S. PATENT DOCUMENTS

| | | | |
|---|---|---|---|
| 4,228,489 | A | 10/1980 | Martin |
| 4,268,894 | A | 5/1981 | Bartunek et al. |
| 4,324,477 | A | 4/1982 | Miyazaki |
| 4,573,109 | A | 2/1986 | Lack |
| 5,203,621 | A | 4/1993 | Weinmeister et al. |
| 5,207,747 | A | 5/1993 | Gordin et al. |
| 5,351,172 | A | 9/1994 | Attree et al. |
| 5,400,234 | A | 3/1995 | Yu |
| 5,428,520 | A | 6/1995 | Skief |
| 5,630,660 | A | 5/1997 | Chen |
| 5,934,628 | A | 8/1999 | Bosnakovic |
| 5,964,524 | A | 10/1999 | Qian |
| 6,045,240 | A | 4/2000 | Hochstein |
| D428,176 | S | 7/2000 | Bamber et al. |
| 6,092,911 | A | 7/2000 | Baker et al. |
| 6,099,142 | A | 8/2000 | Liu |
| 6,149,283 | A | 11/2000 | Conway et al. |
| 6,183,114 | B1 | 2/2001 | Cook et al. |
| 6,213,626 | B1 | 4/2001 | Qian |
| 6,255,786 | B1 | 7/2001 | Yen |
| 6,265,969 | B1 | 7/2001 | Shih |
| D452,022 | S | 12/2001 | Osiecki et al. |
| 6,367,949 | B1 | 4/2002 | Pederson |
| 6,379,023 | B1 | 4/2002 | Passno |
| 6,425,678 | B1 | 7/2002 | Verdes et al. |
| 6,461,017 | B2 | 10/2002 | Selkee |
| 6,474,844 | B1 | 11/2002 | Ching |
| 6,554,459 | B2 | 4/2003 | Yu et al. |
| 6,637,904 | B2 | 10/2003 | Hernandez |
| 6,824,297 | B1 | 11/2004 | Lee |
| 6,845,279 | B1 | 1/2005 | Gilmore et al. |
| 6,854,862 | B1 | 2/2005 | Hopf |
| 6,857,756 | B2 | 2/2005 | Reiff et al. |
| 6,873,249 | B2 | 3/2005 | Chu |
| 6,877,881 | B2 | 4/2005 | Tsao |
| 6,899,441 | B2 | 5/2005 | Chen |
| D506,847 | S | 6/2005 | Hussaini et al. |
| 6,902,294 | B2 | 6/2005 | Wright |
| 6,926,428 | B1 | 8/2005 | Lee |
| 7,001,044 | B2 | 2/2006 | Leen |
| 7,001,047 | B2 | 2/2006 | Holder et al. |
| 7,011,280 | B2 | 3/2006 | Murray et al. |
| 7,063,444 | B2 | 6/2006 | Lee et al. |
| 7,073,926 | B1 | 7/2006 | Kremers et al. |
| D532,536 | S | 11/2006 | Krieger et al. |
| 7,152,997 | B1 | 12/2006 | Kovacik et al. |
| 7,153,004 | B2 | 12/2006 | Galli |
| 7,194,358 | B2 | 3/2007 | Callaghan et al. |
| 7,195,377 | B2 | 3/2007 | Tsai |
| 7,224,271 | B2 | 5/2007 | Wang |
| D553,281 | S | 10/2007 | Rugendyke et al. |
| D553,771 | S | 10/2007 | Watson et al. |
| 7,278,761 | B2 | 10/2007 | Kuan |
| 7,350,940 | B2 | 4/2008 | Haugaared et al. |
| 7,364,320 | B2 | 4/2008 | Van Deursen et al. |
| 7,367,695 | B2 | 5/2008 | Shiau |
| 7,470,036 | B2 | 12/2008 | Deighton et al. |
| 7,484,858 | B2 | 2/2009 | Deighton |
| 7,503,530 | B1 | 3/2009 | Brown |
| D593,236 | S | 5/2009 | Ng et al. |
| 7,566,151 | B2 | 7/2009 | Whelan et al. |
| 7,618,154 | B2 | 11/2009 | Rosiello |
| 7,621,652 | B2 | 11/2009 | Zick |
| 7,638,970 | B1 | 12/2009 | Gebhard et al. |
| 7,641,361 | B2 | 1/2010 | Wedell et al. |
| 7,670,034 | B2 | 3/2010 | Zhang et al. |
| 7,695,162 | B2 | 4/2010 | Zhang et al. |
| 7,798,684 | B2 | 9/2010 | Boissevain |
| D628,325 | S | 11/2010 | Houghton |
| 7,828,465 | B2 | 11/2010 | Roberge et al. |
| 7,857,486 | B2 | 12/2010 | Long et al. |
| 7,914,178 | B2 | 3/2011 | Xiang et al. |
| 7,914,182 | B2 | 3/2011 | Mrakovich et al. |
| 7,972,036 | B1 | 7/2011 | Schach et al. |
| D643,138 | S | 8/2011 | Kawase et al. |
| 7,988,335 | B2 | 8/2011 | Liu et al. |
| 7,990,062 | B2 | 8/2011 | Liu |
| 7,997,753 | B2 | 8/2011 | Walesa |
| 8,007,128 | B2 | 8/2011 | Wu et al. |
| 8,007,145 | B2 | 8/2011 | Leen |
| 8,025,418 | B2 | 9/2011 | Zick |
| 8,029,169 | B2 | 10/2011 | Liu |
| 8,047,481 | B2 | 11/2011 | Shen |
| 8,087,797 | B2 | 1/2012 | Pelletier et al. |
| 8,092,045 | B2 | 1/2012 | Xiao et al. |
| 8,142,045 | B2 | 3/2012 | Peak |
| 8,167,466 | B2 | 5/2012 | Liu |
| 8,201,979 | B2 | 6/2012 | Deighton et al. |
| D665,521 | S | 8/2012 | Werner et al. |
| 8,235,552 | B1 | 8/2012 | Tsuge |
| 8,262,248 | B2 | 9/2012 | Wessel |
| 8,294,340 | B2 | 10/2012 | Yu et al. |
| 8,314,537 | B2 | 11/2012 | Gielen et al. |
| 8,322,892 | B2 | 12/2012 | Scordino et al. |
| 8,328,398 | B2 | 12/2012 | Van Deursen |
| 8,330,337 | B2 | 12/2012 | Yu et al. |
| 8,360,607 | B2 | 1/2013 | Bretschneider et al. |
| 8,366,290 | B2 | 2/2013 | Maglica |
| 8,403,522 | B2 | 3/2013 | Chang |
| 8,414,160 | B2 | 4/2013 | Sun et al. |
| 8,425,091 | B2 | 4/2013 | Chen |
| 8,439,531 | B2 | 5/2013 | Trott et al. |

(56) References Cited

U.S. PATENT DOCUMENTS

| | | | |
|---|---|---|---|
| 8,465,178 | B2 | 6/2013 | Wilcox et al. |
| 8,485,691 | B2 | 7/2013 | Hamel et al. |
| 8,547,022 | B2 | 10/2013 | Summerford et al. |
| D695,434 | S | 12/2013 | Shen |
| 8,599,097 | B2 | 12/2013 | Intravatola |
| D698,471 | S | 1/2014 | Poon |
| D699,874 | S | 2/2014 | Chilton et al. |
| 8,651,438 | B2 | 2/2014 | Deighton et al. |
| 8,659,433 | B2 | 2/2014 | Petrou |
| 8,662,702 | B2 | 3/2014 | Datz et al. |
| 8,692,444 | B2 | 4/2014 | Patel et al. |
| 8,696,177 | B1 | 4/2014 | Frost |
| D705,467 | S | 5/2014 | Aglassinger |
| 8,760,043 | B2 | 6/2014 | Gielen et al. |
| D708,376 | S | 7/2014 | Crowe et al. |
| 8,801,226 | B2 | 8/2014 | Moore |
| 8,840,268 | B2 | 9/2014 | Datz et al. |
| 8,851,699 | B2 | 10/2014 | McMillan |
| 8,858,016 | B2 | 10/2014 | Strelchuk |
| 8,858,026 | B2 | 10/2014 | Lee et al. |
| 8,888,330 | B2 | 11/2014 | Kang et al. |
| 8,939,602 | B2 | 1/2015 | Wessel |
| 8,979,331 | B2 | 3/2015 | Lee et al. |
| D726,354 | S | 4/2015 | Davies |
| D728,402 | S | 5/2015 | Case |
| 9,062,875 | B2 | 6/2015 | Neal |
| 9,068,736 | B2 | 6/2015 | Lee et al. |
| D744,139 | S | 11/2015 | Itoh et al. |
| 9,222,633 | B2 | 12/2015 | Inskeep |
| D747,263 | S | 1/2016 | Lafferty |
| D747,523 | S | 1/2016 | Salmon |
| 9,557,046 | B2 | 1/2017 | Sun et al. |
| 9,851,077 | B2 | 12/2017 | Demuynck |
| 9,967,920 | B2 | 5/2018 | Itoh et al. |
| 10,030,863 | B2 | 7/2018 | Pickard et al. |
| 11,686,454 | B2 | 6/2023 | Young et al. |
| 2002/0136005 | A1 | 9/2002 | Lee |
| 2002/0167814 | A1 | 11/2002 | Ching |
| 2003/0090234 | A1 | 5/2003 | Glasglow |
| 2003/0090904 | A1 | 5/2003 | Ching |
| 2003/0137847 | A1 | 7/2003 | Cooper |
| 2003/0174503 | A1 | 9/2003 | Yueh |
| 2005/0265035 | A1 | 12/2005 | Brass et al. |
| 2006/0007682 | A1 | 1/2006 | Reiff et al. |
| 2006/0067077 | A1 | 3/2006 | Kumthampinij et al. |
| 2006/0132323 | A1 | 6/2006 | Grady |
| 2006/0146550 | A1 | 7/2006 | Simpson et al. |
| 2006/0279948 | A1 | 12/2006 | Tsai |
| 2006/0285323 | A1 | 12/2006 | Fowler |
| 2007/0211470 | A1 | 9/2007 | Huang |
| 2007/0297167 | A1 | 12/2007 | Greenhoe |
| 2008/0112160 | A1 | 5/2008 | Robinson et al. |
| 2008/0112170 | A1 | 5/2008 | Trott et al. |
| 2008/0158887 | A1 | 7/2008 | Zhu et al. |
| 2008/0165537 | A1 | 7/2008 | Shiau |
| 2008/0198588 | A1 | 8/2008 | O'Hern |
| 2008/0253125 | A1 | 10/2008 | Kang et al. |
| 2008/0291673 | A1 | 11/2008 | Chen et al. |
| 2008/0302933 | A1 | 12/2008 | Cardellini |
| 2009/0080205 | A1 | 3/2009 | Chang et al. |
| 2009/0134191 | A1 | 5/2009 | Phillips |
| 2009/0135594 | A1 | 5/2009 | Yu et al. |
| 2009/0231167 | A1 | 9/2009 | Chen |
| 2009/0303717 | A1 | 12/2009 | Long et al. |
| 2009/0323348 | A1 | 12/2009 | Shuai et al. |
| 2010/0027260 | A1 | 2/2010 | Liu |
| 2010/0027269 | A1 | 2/2010 | Lo et al. |
| 2010/0072897 | A1 | 3/2010 | Zheng |
| 2010/0080005 | A1 | 4/2010 | Gattari |
| 2010/0091495 | A1 | 4/2010 | Patrick |
| 2010/0142213 | A1 | 6/2010 | Bigge et al. |
| 2010/0315824 | A1 | 12/2010 | Chen |
| 2010/0328951 | A1 | 12/2010 | Boissevain |
| 2011/0031887 | A1 | 2/2011 | Stoll et al. |
| 2011/0038144 | A1 | 2/2011 | Chang |
| 2011/0050070 | A1 | 3/2011 | Pickard |
| 2011/0058367 | A1 | 3/2011 | Shiau et al. |
| 2011/0075404 | A1 | 3/2011 | Allen et al. |
| 2011/0121727 | A1 | 5/2011 | Sharrah et al. |
| 2011/0156584 | A1 | 6/2011 | Kim |
| 2011/0228524 | A1 | 9/2011 | Greer |
| 2011/0286216 | A1 | 11/2011 | Araman |
| 2011/0317420 | A1 | 12/2011 | Jeon et al. |
| 2012/0026729 | A1 | 2/2012 | Sanchez et al. |
| 2012/0033400 | A1 | 2/2012 | Remus et al. |
| 2012/0033415 | A1 | 2/2012 | Sharrah et al. |
| 2012/0033429 | A1 | 2/2012 | Van De Ven |
| 2012/0044707 | A1 | 2/2012 | Breidenassel |
| 2012/0048511 | A1 | 3/2012 | Moshtagh |
| 2012/0049717 | A1 | 3/2012 | Lu |
| 2012/0057351 | A1 | 3/2012 | Wilcox et al. |
| 2012/0080944 | A1 | 4/2012 | Recker et al. |
| 2012/0087118 | A1 | 4/2012 | Bailey et al. |
| 2012/0087125 | A1 | 4/2012 | Liu |
| 2012/0098437 | A1 | 4/2012 | Smed |
| 2012/0120674 | A1 | 5/2012 | Jonker |
| 2012/0140455 | A1 | 6/2012 | Chang et al. |
| 2012/0155104 | A1 | 6/2012 | Jonker |
| 2012/0212963 | A1 | 8/2012 | Jigamain |
| 2012/0234519 | A1 | 9/2012 | Lee |
| 2012/0236551 | A1 | 9/2012 | Sharrah et al. |
| 2012/0247735 | A1 | 10/2012 | Ito et al. |
| 2012/0262917 | A1 | 10/2012 | Courcelle |
| 2012/0300487 | A1 | 11/2012 | Jonker |
| 2013/0032323 | A1 | 2/2013 | Hsu |
| 2013/0058078 | A1 | 3/2013 | Meng |
| 2013/0063051 | A1 | 3/2013 | Sterling et al. |
| 2013/0077296 | A1 | 3/2013 | Goeckel et al. |
| 2013/0128565 | A1 | 5/2013 | Cugini et al. |
| 2013/0176713 | A1 | 7/2013 | Deighton et al. |
| 2013/0187785 | A1 | 7/2013 | McIntosh et al. |
| 2013/0258645 | A1 | 10/2013 | Weber et al. |
| 2013/0265780 | A1 | 10/2013 | Choski et al. |
| 2013/0322073 | A1 | 12/2013 | Hamm et al. |
| 2014/0043800 | A1 | 2/2014 | Weber et al. |
| 2014/0140050 | A1 | 5/2014 | Wong et al. |
| 2014/0192543 | A1 | 7/2014 | Deighton et al. |
| 2014/0218936 | A1 | 8/2014 | Mahling et al. |
| 2014/0240990 | A1 | 8/2014 | Bae |
| 2014/0268775 | A1 | 9/2014 | Kennemer et al. |
| 2014/0301066 | A1 | 10/2014 | Inskeep |
| 2014/0307443 | A1 | 10/2014 | Clifford et al. |
| 2014/0350716 | A1 | 11/2014 | Fly |
| 2014/0376216 | A1 | 12/2014 | McLoughlin et al. |
| 2015/0023771 | A1 | 1/2015 | Carr et al. |
| 2015/0233569 | A1 | 8/2015 | Xue et al. |
| 2015/0233571 | A1 | 8/2015 | Inan et al. |
| 2016/0123571 | A1 | 5/2016 | Chan et al. |
| 2016/0165701 | A1 | 6/2016 | Smith |
| 2016/0348879 | A1 | 12/2016 | Young et al. |

FOREIGN PATENT DOCUMENTS

| | | | |
|---|---|---|---|
| CN | 201209788 | Y | 3/2009 |
| CN | 201265753 | Y | 7/2009 |
| CN | 201582671 | U | 9/2010 |
| CN | 201636537 | U | 11/2010 |
| CN | 201724025 | U | 1/2011 |
| CN | 201954383 | U | 8/2011 |
| CN | 202159216 | U | 3/2012 |
| CN | 202216006 | U | 5/2012 |
| CN | 102563388 | A | 7/2012 |
| CN | 102588785 | A | 7/2012 |
| CN | 202349859 | U | 7/2012 |
| CN | 202493906 | U | 10/2012 |
| CN | 202927498 | U | 5/2013 |
| CN | 202972571 | U | 6/2013 |
| CN | 202992675 | U | 6/2013 |
| CN | 203240297 | U | 10/2013 |
| CN | 203671276 | U | 6/2014 |
| CN | 204268320 | U | 4/2015 |
| DE | 4003808 | A1 | 8/1991 |
| DE | 202007005003 | U1 | 7/2007 |
| EP | 0193756 | A2 | 9/1986 |

(56) References Cited

FOREIGN PATENT DOCUMENTS

| | | | |
|---|---|---|---|
| EP | 1205428 | A1 | 5/2002 |
| EP | 1439120 | A2 | 7/2004 |
| EP | 2436641 | A1 | 4/2012 |
| GB | 2424694 | A | 10/2006 |
| JP | 2653392 | B2 | 9/1997 |
| JP | 3159384 | U | 5/2010 |
| KR | 100827374 | B1 | 5/2008 |
| KR | 20100116933 | A | 11/2010 |
| KR | 200472966 | Y1 | 6/2014 |
| WO | 02044503 | A1 | 6/2002 |
| WO | 2014083117 | A1 | 6/2014 |
| WO | 2014199684 | A1 | 12/2014 |
| WO | 2014207595 | A1 | 12/2014 |

OTHER PUBLICATIONS

European Patent Office Action for 16708244.5 dated Jun. 15, 2018 (6 pages).
European Patent Office Extended Search Report for Application No. 19199968.9 dated Nov. 15, 2019 (8 pages).
European Patent Office Action for Application 19199968.9 dated Nov. 9, 2021 (6 pages).
European Patent Office Action for Application No. 19199968.9 dated Sep. 29, 2022 (6 pages).

LIGHT

RELATED APPLICATIONS

This application is a continuation of U.S. patent application Ser. No. 17/979,274, filed Nov. 2, 2022, now U.S. Pat. No. 11,796,166, which is a divisional of U.S. patent application Ser. No. 17/853,297, filed Jun. 29, 2022, now U.S. Pat. No. 11,536,444, which is a divisional of U.S. patent application Ser. No. 17/683,628, filed Mar. 1, 2022, now U.S. Pat. No. 11,408,605, which is a continuation of U.S. patent application Ser. No. 16/815,176, filed Mar. 11, 2020, now U.S. Pat. No. 11,415,310, which is a continuation of U.S. patent application Ser. No. 16/290,252, filed Mar. 1, 2019, now U.S. Pat. No. 10,627,100, which is a continuation of U.S. patent application Ser. No. 16/056,602, filed Aug. 7, 2018, now U.S. Pat. No. 10,386,057, which is a continuation of U.S. patent application Ser. No. 15/851,013, filed Dec. 21, 2017, now U.S. Pat. No. 10,066,827, which is a continuation of U.S. patent application Ser. No. 15/015,794, filed Feb. 4, 2016, now U.S. Pat. No. 9,851,088, which claims priority to U.S. Provisional Patent Application No. 62/111,990, filed on Feb. 4, 2015, and to U.S. Provisional Patent Application No. 62/265,935, filed on Dec. 10, 2015, the entire contents of all of which are incorporated herein by reference.

BACKGROUND

The invention relates to a portable light and more particularly to portable lights that include LEDs.

SUMMARY

In one construction, the light includes a plurality of LEDs that operate under either an AC or DC power supply. A chimney extends through the light and operates to enhance the cooling of the LEDs.

In another construction, a light includes a housing defining a bottom end and a top end, a heat sink disposed within the housing and including a central body that defines a central aperture, and a plurality of arms coupled to the central body and extending outward from the central body, each of the arms including a light receiving surface. A plurality of LEDs is coupled to each of the light receiving surfaces and a hollow tube extends from the bottom of the housing and is coupled to the heat sink to define a cooling air passage that passes through the hollow tube and the central aperture to direct cooling air from the bottom of the housing to the top of the housing.

In another construction, a light includes a housing, a heat sink disposed within the housing, a plurality of LEDs coupled to the heat sink and operable in response to a supply of power, and a first power supply including two power tool battery packs selectively coupled to the housing. A second power supply is arranged to receive AC power from an external source, and a power control circuit is operable to detect the level of charge in each of the power tool battery packs and to deliver power to the LEDs sequentially from the battery packs beginning with the battery pack having the lowest state of charge.

In still another construction, a light includes a housing defining a bottom end and a top end, and a heat sink disposed within the housing and including a central body that defines a central aperture and a plurality of external apertures, the central aperture extending along a central axis of the light and each of the external apertures extending along external axes that are parallel to and offset from the central axis. A plurality of arms is coupled to the central body and extends outward from the central body. Each of the arms includes a light receiving surface and a plurality of fins that extend from the light receiving surface toward the central axis. A plurality of LEDs is coupled to each of the light receiving surfaces, and a cooling air flow path extends from the bottom of the housing through the heat sink aperture to direct cooling air from the bottom of the housing to the top of the housing.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
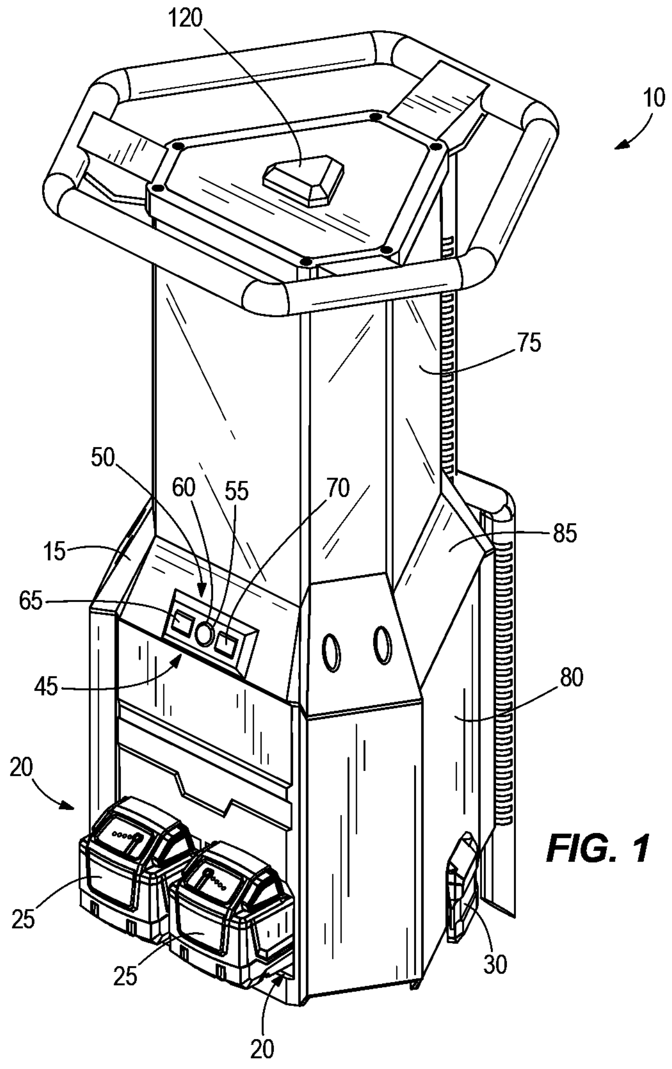
FIG. 1 is a perspective view of a light in accordance with an embodiment of the invention.

FIG. 1 illustrates a portable light 10 that is well-suited for use in areas where conventional lighting may not be available or may be inadequate. The illustrated light 10 includes a housing 15 that defines two battery ports 20 arranged to receive battery packs 25 to power the light 10. In preferred constructions, the battery packs 25 are power tool battery packs 25 that are operable at 18 volts or higher. In other constructions, other battery packs 25 may be used and more than two or a single battery pack 25 may be employed. In preferred constructions, the light 10 uses open link protocol and controls the battery packs 25 so that they transmit information sequentially and so that their messages do not overlap.

The housing 15 contains the electrical components of the area light 10. Specifically, the housing 15 includes power inputs 30 and power outlets 35 (shown in FIG. 4). The power inlets 30 connect the area light 10 to an external AC power source to power the area light 10. The power outlet 35 connects the area light 10 to another device to power that device. For example, in some embodiments, the power outlets can connect to another light so that a series of area lights 10 can be daisy-chained together. In other embodiments, the power outlet 35 can connect to a power tool to power the power tool. The housing 15 also supports charging circuits 40. The charging circuit 40 electrically couples the power inlet 30 to the battery pack 25 to charge the battery pack 25. The charging circuits 40 are accessible from the exterior of the housing 15 for inserting and removing the battery packs 25. In some embodiments, the battery packs 25 may be internal or permanently fixed to the area light 10 but are preferably removable power tool battery packs 25.

The illustrated housing 15 further includes a control panel 45 and a display panel 50 for controlling the operation of the area light 10 and displaying information relevant to the operation of the light 10 including various operating parameters or conditions of the light 10. The control panel 45 includes, among other things, a power button 55, a light intensity control 60, a light intensity indicator 65, and a power source indicator 70. The light intensity control 60 allows a use to increase or decrease the intensity of the light 10. There can be three intensity settings when the area light 10 is using DC power and six intensity settings when the area light 10 is using AC power. The light intensity indicator 65 may include a plurality of indicator bars that depict the level of intensity that the light 10 is supplying. Additionally the indicator bars may appear one color when the area light 10 is using DC power and a different color when the area light 10 is using AC power. The power source indicator 70 may include a second set of indicator bars that depict the amount of power (i.e., the state of charge) remaining in the battery packs 25. The panel 50 may also include an indicator that indicates what operating mode the light is in or other features and parameters of the light 10.

In some arrangements, the light 10 is operable remotely using any suitable communication scheme (e.g., Bluetooth, ONE-KEY etc.). In one construction, ONE-KEY can be used to remotely control the light 10. In these constructions, the panel 45, 50 may include an indicator that operates to notify a user when ONE-KEY is being used to control the light 10. In addition, there may be a control that locks the light 10 from being able to be controlled by a ONE-KEY device. The lock-out could be permanent or it could be for a fixed and predetermined period of time.

ONE-KEY includes an application for use on mobile devices such as smartphones and tablets. The ONE-KEY application could include a battery charge indicator and a status indicator (e.g., charging, waiting to charge, fully charged, etc.). In one construction, a desired run time can be selected (either at the control panel 45 or in the ONE-KEY application), and the light 10 computes a light intensity to achieve that run time based on the current state of charge of the battery packs 25, and the light output is set to that level of intensity.

In addition, the ONE-KEY application may allow the user to control what is done in response to a loss of DC (battery) power. For example, the light 10 could turn off, flash, run for a limited additional time period, etc. In one embodiment the light 10 is configured to adjust its brightness lower based on the proximity of the device that is using the ONE-KEY application to control the light 10.

In operation, if both the battery pack 25 and an AC power source are connected to the area light 10, the AC power source will charge the battery pack 25 and power the area light 10. If multiple battery packs 25 are inserted into the battery ports 20 (thereby connecting to charging circuits) during this time, the AC power will be used to charge one battery pack 25 at a time until all of the battery packs 25 are charged. When the AC power source becomes disconnected from the area light 10, the battery pack 25 (if sufficiently charged) will automatically begin powering the area light 10.

Although multiple battery packs 25 can be inserted into the battery ports 20 at a given time, the illustrated area light 10 only utilizes one battery pack 25 at a time. The area light 10 will utilize one battery pack 25 until that battery pack 25 has been fully drained of power. Then, the next battery pack 25 will begin powering the area light 10. In other words, the area light 10 is configured to utilize the battery packs 25 sequentially rather than in parallel.

When only a single battery pack 25 is inserted into the battery port 20 and thereby connected to the charging circuit 40, the area light 10 will engage in a power saving mode. During the power saving mode, the area light 10 will prolong the battery life by automatically decreasing the light intensity when the charge of the battery pack 25 falls below a certain level. When two or more battery packs 25 are inserted into the battery port 20, the area light 10 will continue to operate at the specified intensity level until each battery pack 25 is drained. When only one battery pack 25 remains un-drained, the area light 10 will go back into the power saving mode, reducing the intensity of the light in order to extend the battery life of the remaining battery pack 25.

Thus, the light 10 can be powered by DC current provided by the battery packs 25 or AC power provided by a conventional AC power source. When the light 10 is powered by DC from the battery packs 25, the light 10 first takes power from the battery pack 25 that has the lower state of charge to preserve the charge of the more highly charged battery pack 25. The battery packs 25 are then discharged in sequence and not in parallel. Of course, other arrangements or operating modes may vary the discharge arrangement of the battery packs 25.

Figure 5:
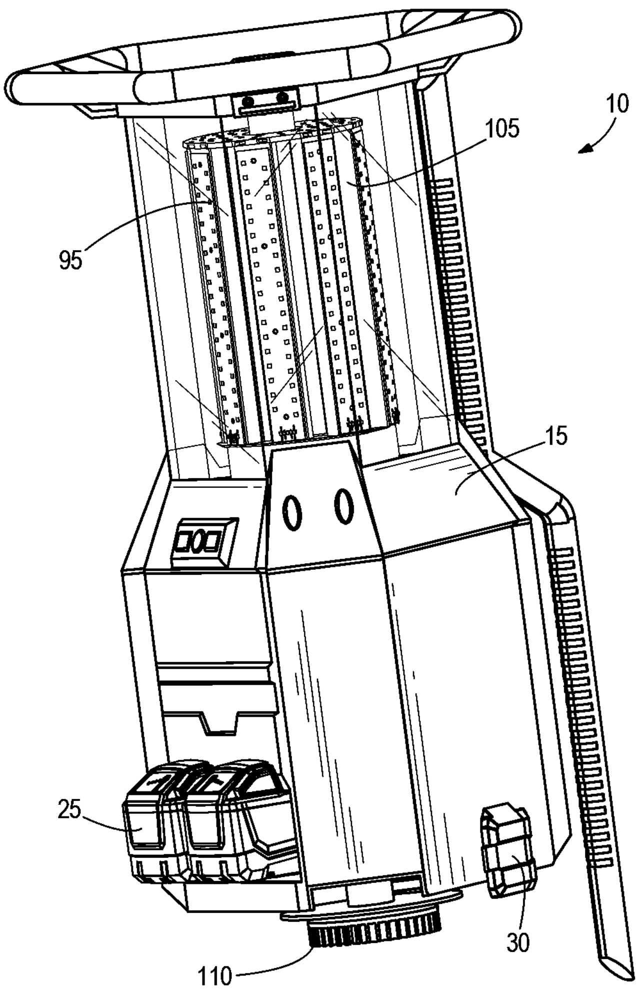
FIG. 5 is a perspective view of the light of FIG. 1.

With reference to FIG. 5, an upper portion 75 of the housing 15 operates to enclose the top portion of the light 10 and operate as a lens or diffuser to improve the quality of the light emitted by the light 10. A bottom cover 80, illustrated in FIG. 3 and a middle cover 85, illustrated in FIG. 2 cooperate with the upper portion 75 of the housing 15 to substantially enclose a water-tight space within the light 10.

Figure 2:
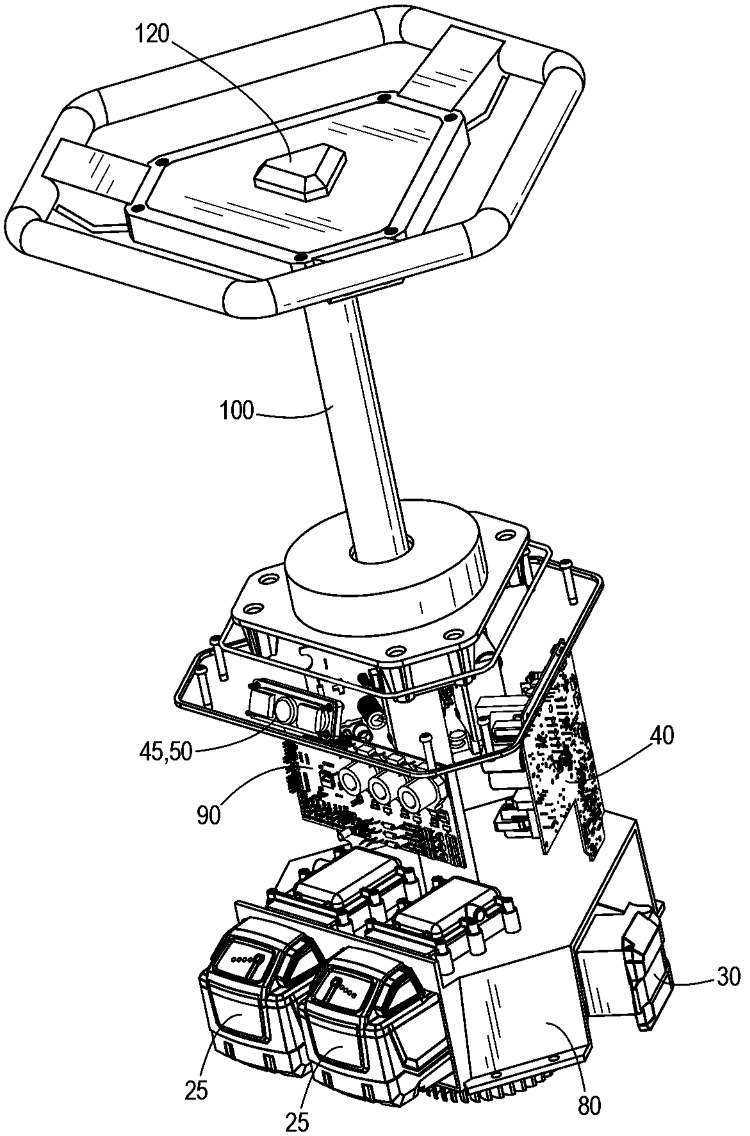
FIG. 2 is a perspective view of the light of FIG. 1 with the external covers removed.
Figure 3:
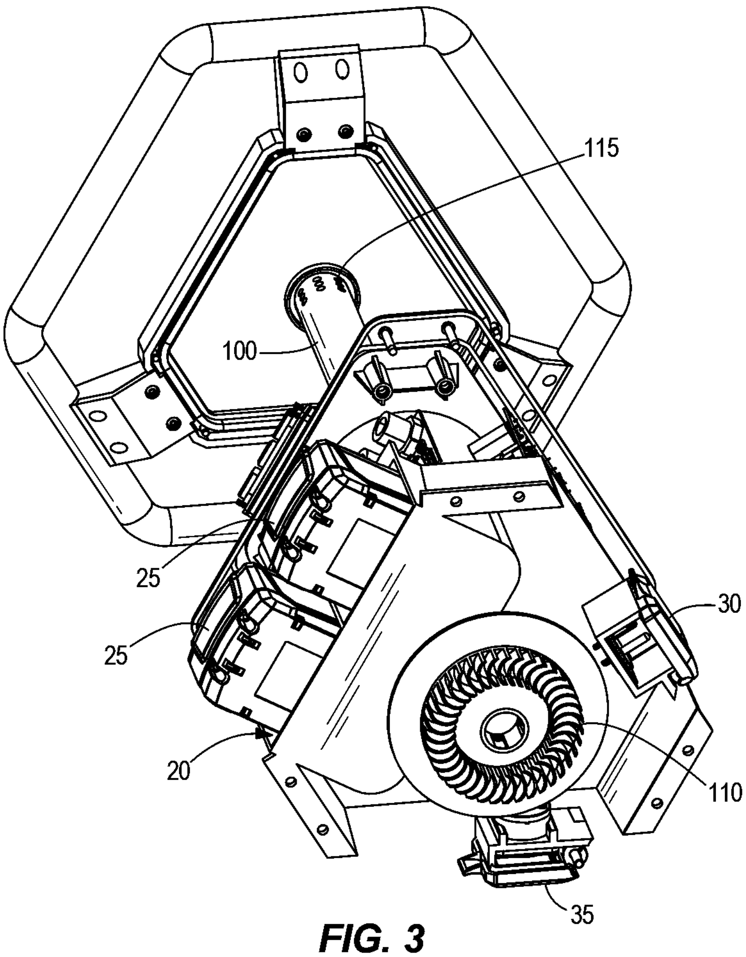
FIG. 3 is a bottom perspective view of the light arranged as shown in FIG. 2.

As illustrated in FIG. 2, the light 10 includes a plurality of printed circuit boards 90 that control the flow of power (including the charging circuit) and control the operation of the light 10. The circuit boards 90 are positioned within the water-tight space to protect the electronics from moisture.

Figure 6:
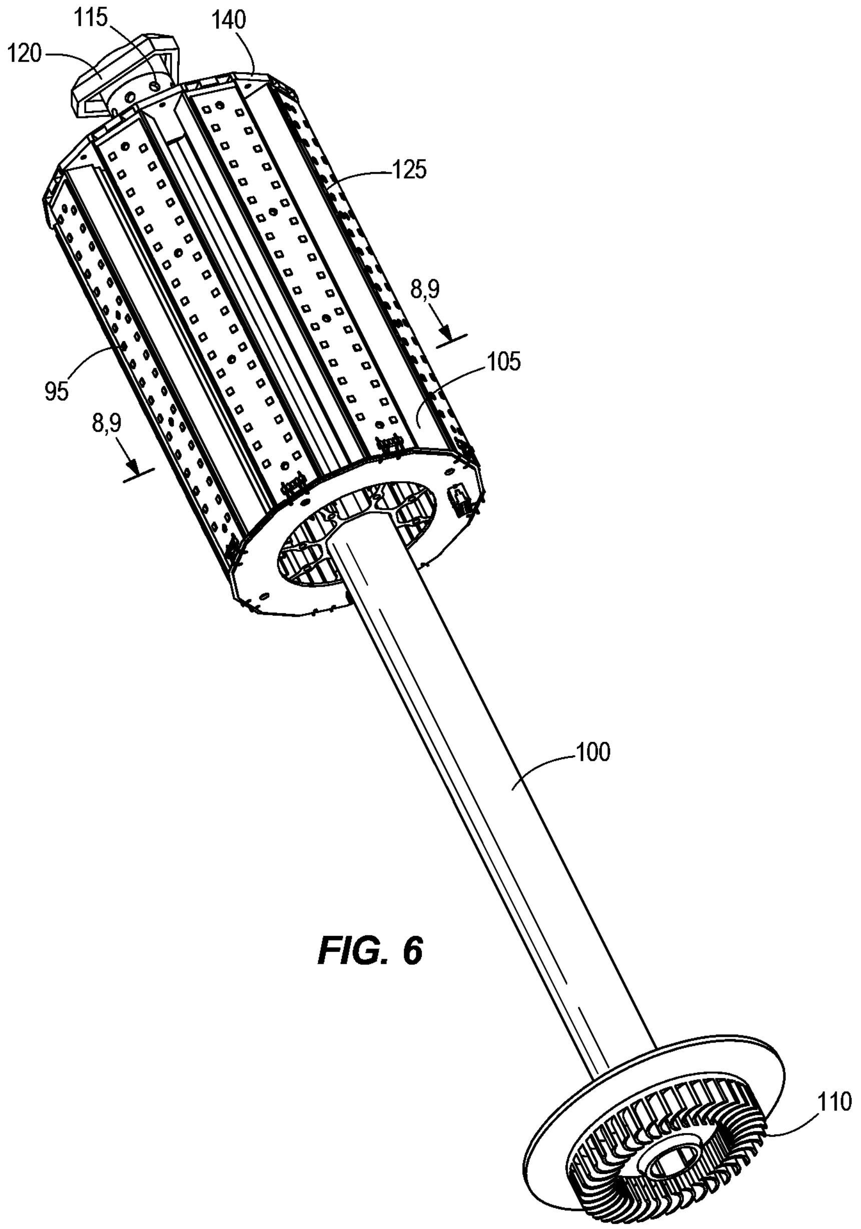
FIG. 6 is a perspective view of a chimney and light support member of the light of FIG. 1.
Figure 7:
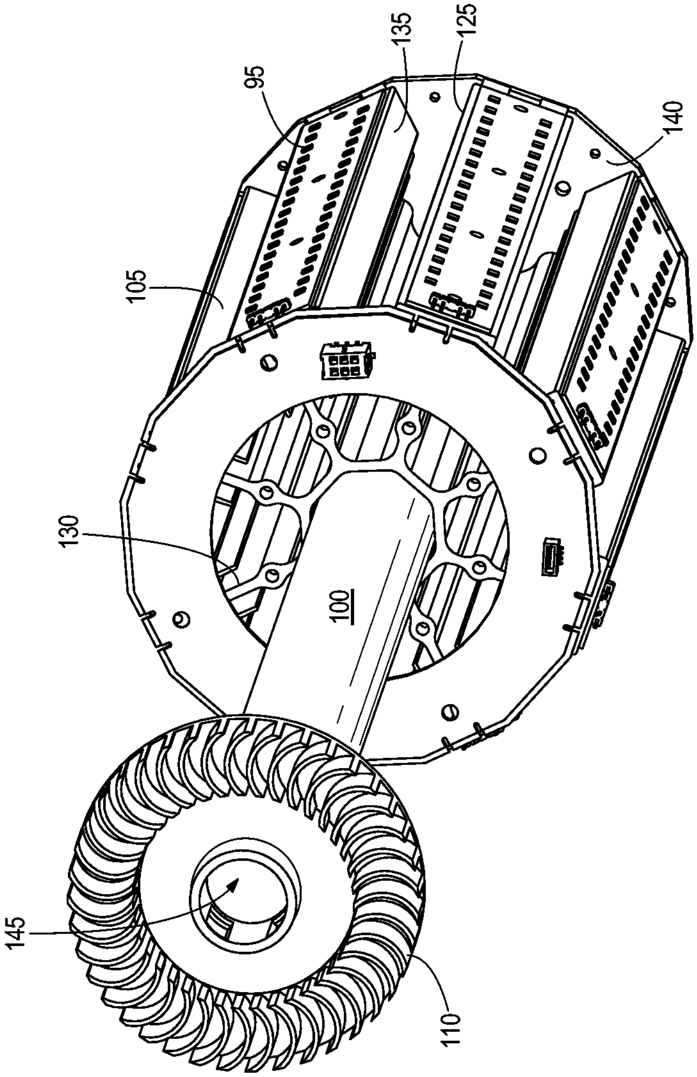
FIG. 7 is a bottom perspective view of the chimney and light support member of the light of FIG. 1.

With reference to FIG. 5, the light 10 includes a plurality of LEDs 95 that are positioned inside of the housing 15 and are operable to emit light (e.g., 10*k* lumens or more) as desired. In order to dissipate heat, the light 10 includes a tube or chimney 100 and light support member or heat sink 105 as are best illustrated in FIG. 6. The chimney 100 includes a substantially hollow tube that extends from the bottom of the light 10 to the top of the light 10. Seals are formed between the chimney 100 and the housings 15 to maintain the substantially water-tight space.

Figure 4:
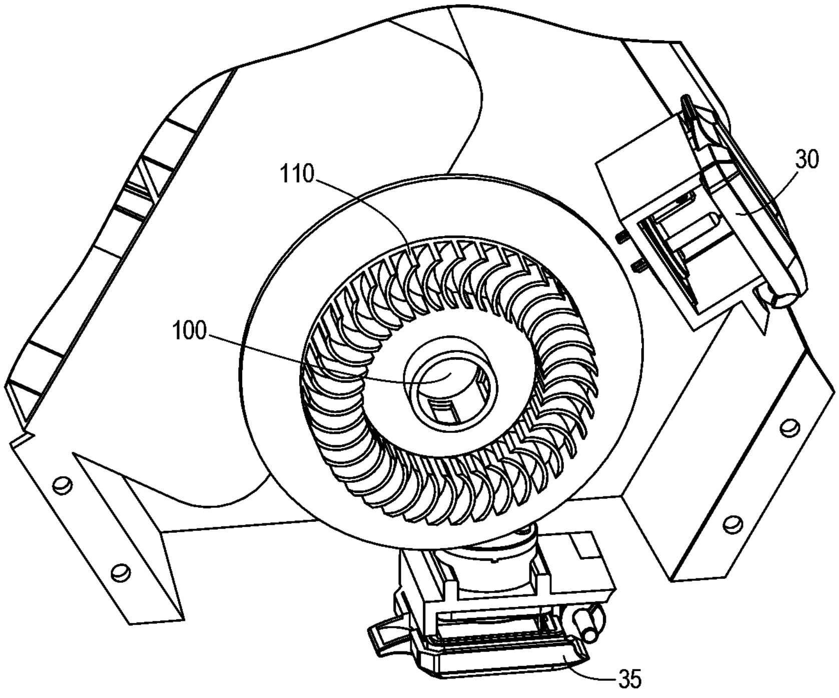
FIG. 4 is an enlarged view of the bottom of the light of FIG. 1.

A finned inlet member 110, illustrated in FIG. 4, is attached to the bottom of the chimney 100 or housing 15 and operates to guide cooling air into the chimney 100. A seal between the finned member 110, the chimney 100, and the housing 15 inhibits access to the chimney 100 by a user and/or debris entrance into the chimney 100. The top portion of the chimney 100 includes a plurality of apertures 115 that facilitate the escape of hot air from the chimney 100. A triangular cover member 120 engages the top of the chimney 100 to force the air out of the apertures 115 and also to inhibit access to the chimney 100 by a user or unwanted debris or water.

Figure 10:
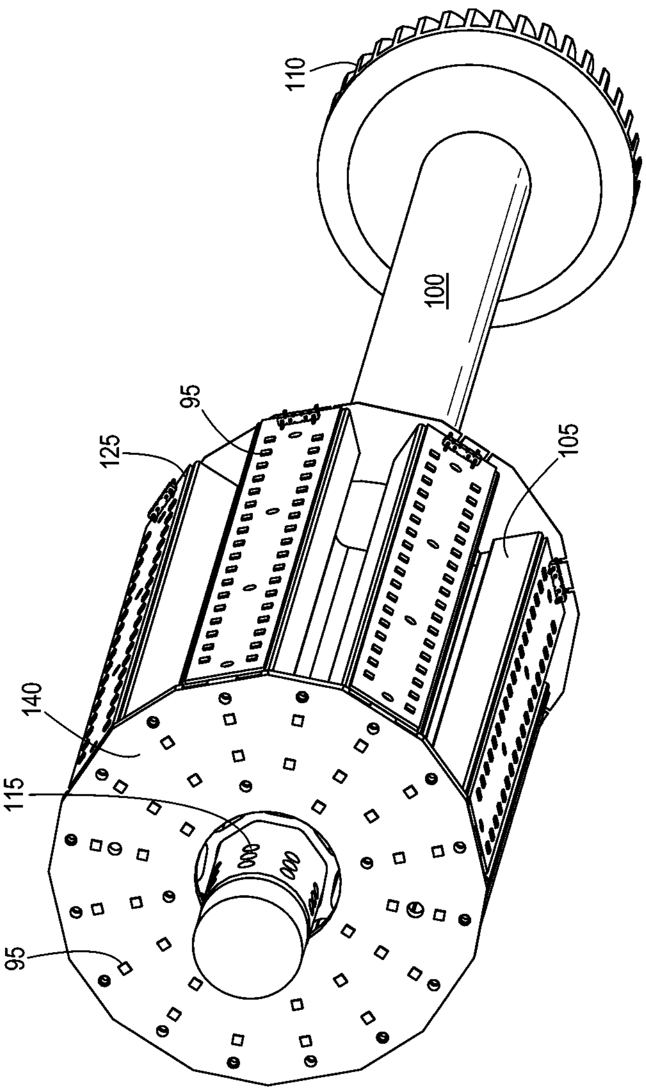
FIG. 10 is a top perspective view of the chimney and light support member of the light of FIG. 1.
Figure 11:
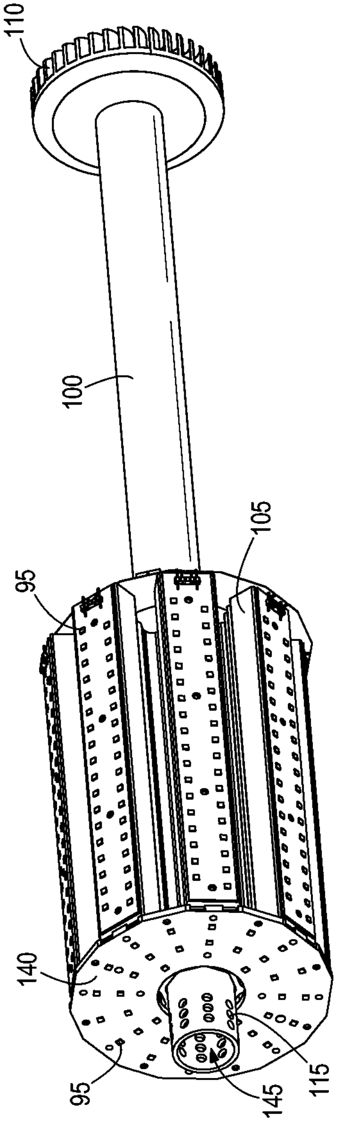
FIG. 11 is a perspective view of the chimney and light support member of the light of FIG. 1.
Figure 12:
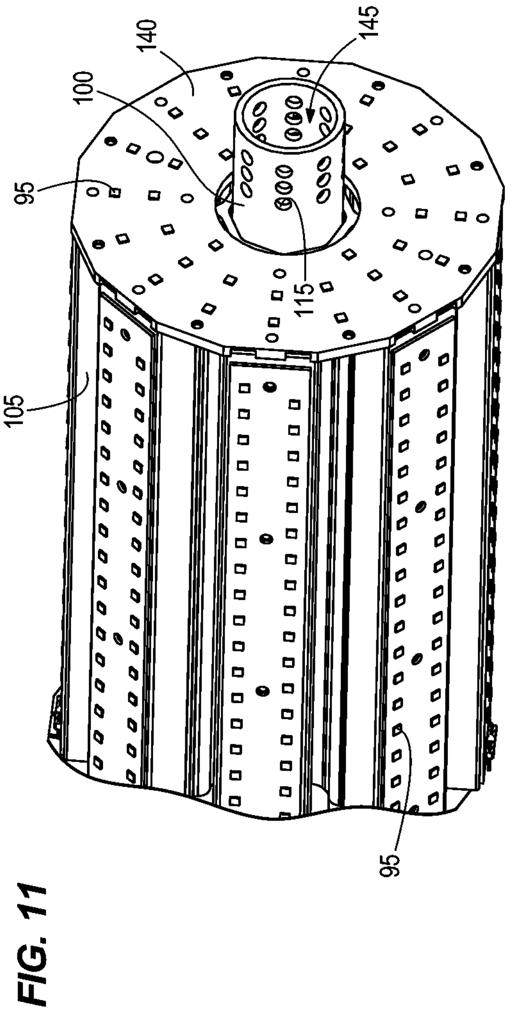
FIG. 12 is an enlarged perspective view of the light support member of the light of FIG. 1.

The light support member 105, illustrated in FIGS. 6 and 10, is formed from a heat conducting material and includes a plurality of LED support surfaces 125. The LEDs 95 are attached to these surfaces 125 and heat generated by the LEDs 95 is conducted into the light supporting member 105. The member 105 includes a plurality of arms 130 that extend outward and support a plurality of fins 135 that increase the surface area and further enhance cooling. In addition, LEDs 95 may be attached to a top support member 140 that attaches to the top of the light supporting member 105 to emit light from the top of the light 10.

Figure 8:
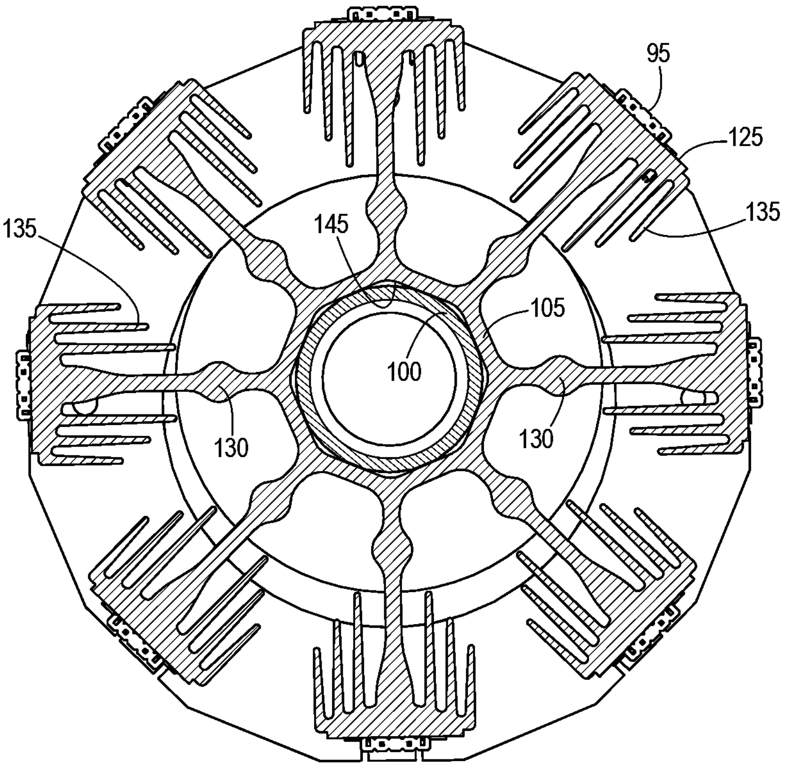
FIG. 8 is a section view of the light support member of FIG. 6.
Figure 9:
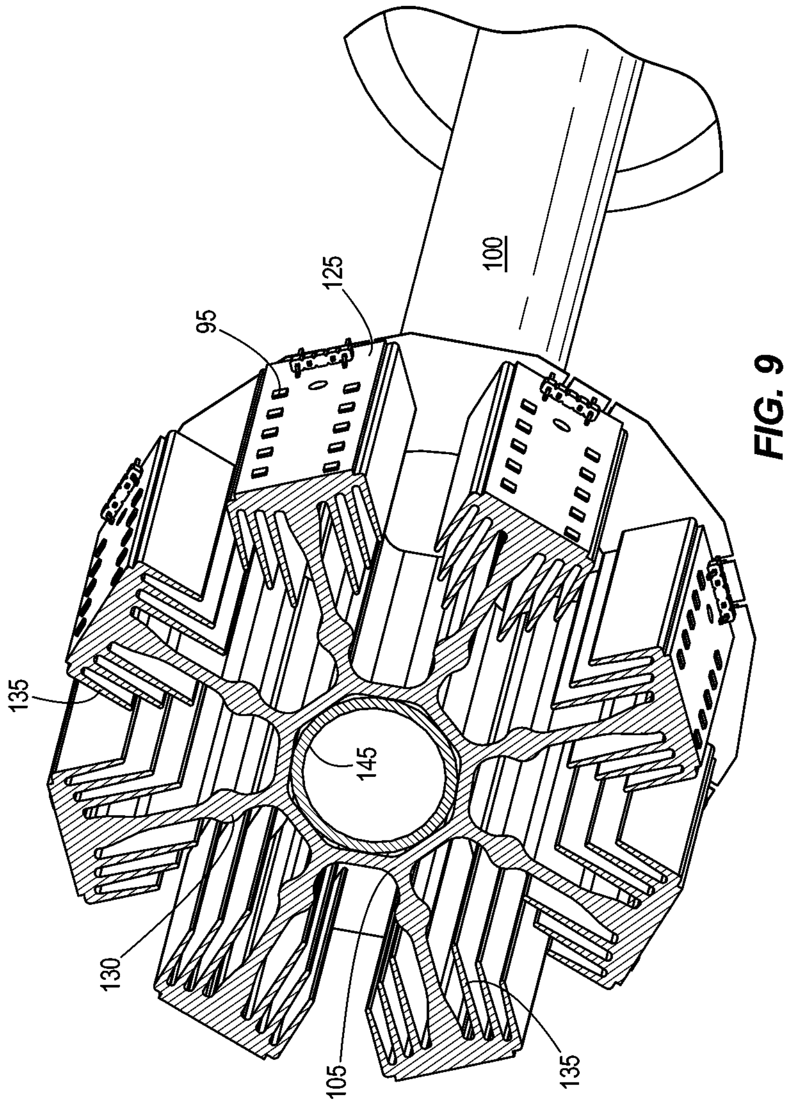
FIG. 9 is a perspective view of the light support member in section as shown in FIG. 8.

As illustrated in FIG. 8, a central aperture 145 formed in the light supporting member 105 receives the chimney 100 and provides thermal conduction therebetween. In the illustrated construction, the central aperture 145 is polygonal with other shapes being possible. In preferred constructions, the circuit boards 90 are also connected, or at least thermally coupled to the chimney 100 to aid in thermal conduction and cooling of the circuit boards 90.

In operation, the LEDs 95 are powered by either the DC power supply or the AC power supply to generate the desired illumination. The circuit boards 90 and the LEDs 95 generate a significant amount of heat during operation. Some of that heat is conducted into the chimney 100 either directly, or through the light supporting member 105. As the chimney 100 heats, a natural convection pattern is established. The hot air within the chimney 100 rises and exits the light 10, thereby drawing additional cool air into the bottom of the light 10. In this manner, the cooling ability of the light 10 is enhanced.

Figure 13:
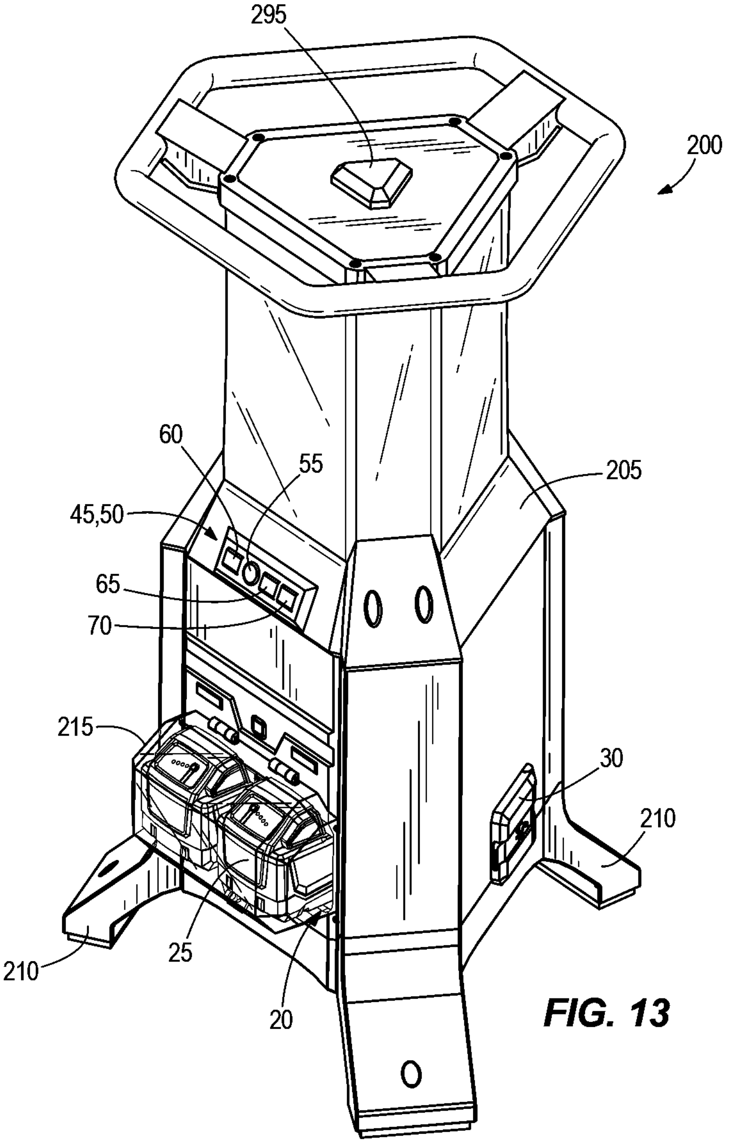
FIG. 13 is a perspective view of a light in accordance with another embodiment of the invention.

FIGS. 13-22 illustrate another version of the light 200 of FIGS. 1-12. As illustrated in FIG. 13, the light 200 includes a housing 205 that is similar to that of the light 10 of FIG. 1. However, the light 200 does not include an external handle but rather includes a plurality of legs 210 that provide support for the housing 205 while providing an air space under the housing 205. In addition, a hinged cover 215 is provided that can open to receive or remove one or both of the power tool battery packs 25. In the illustrated construction, the cover 215 is illustrated as transparent. However, opaque and colored covers could also be employed if desired.

Figure 14:
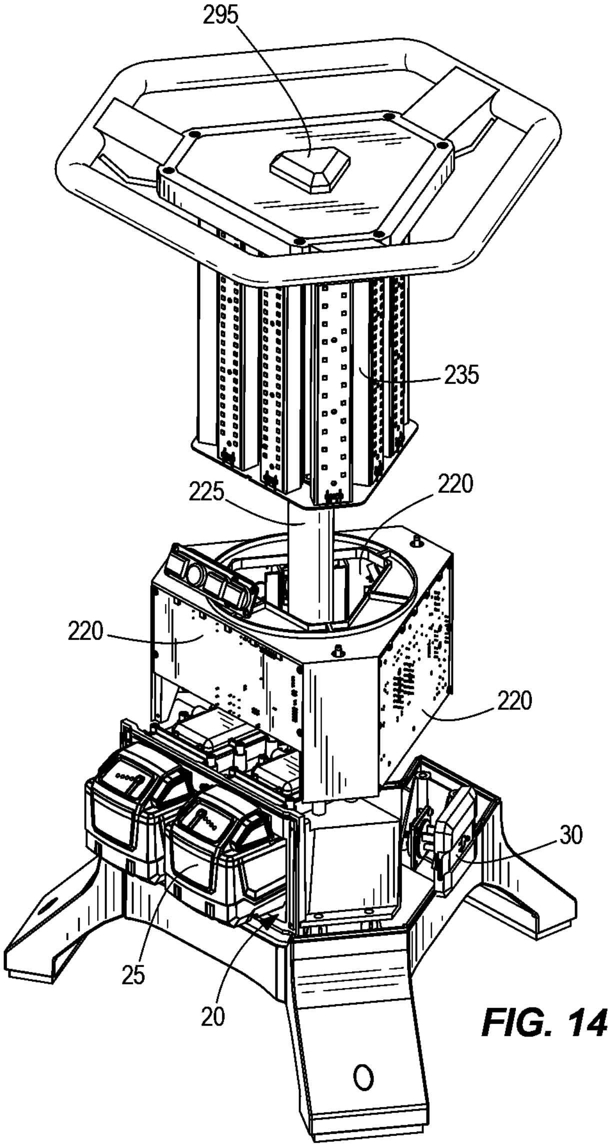
FIG. 14 is a perspective view of the light of FIG. 13 with the external covers removed.
Figure 15:
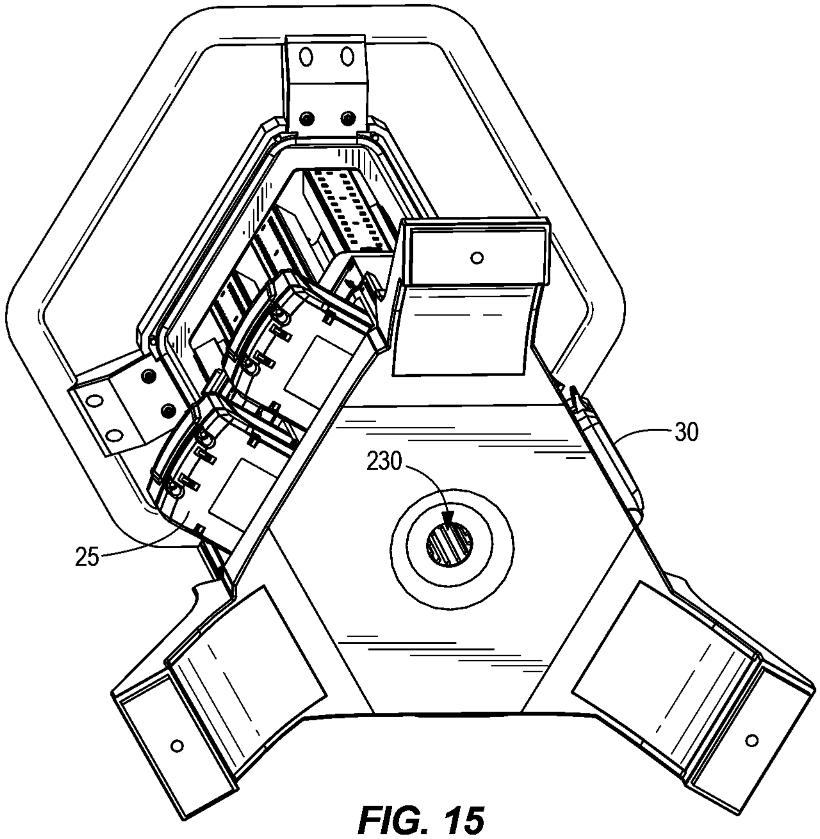
FIG. 15 is a bottom perspective view of the light arranged as shown in FIG. 14.
Figure 16:
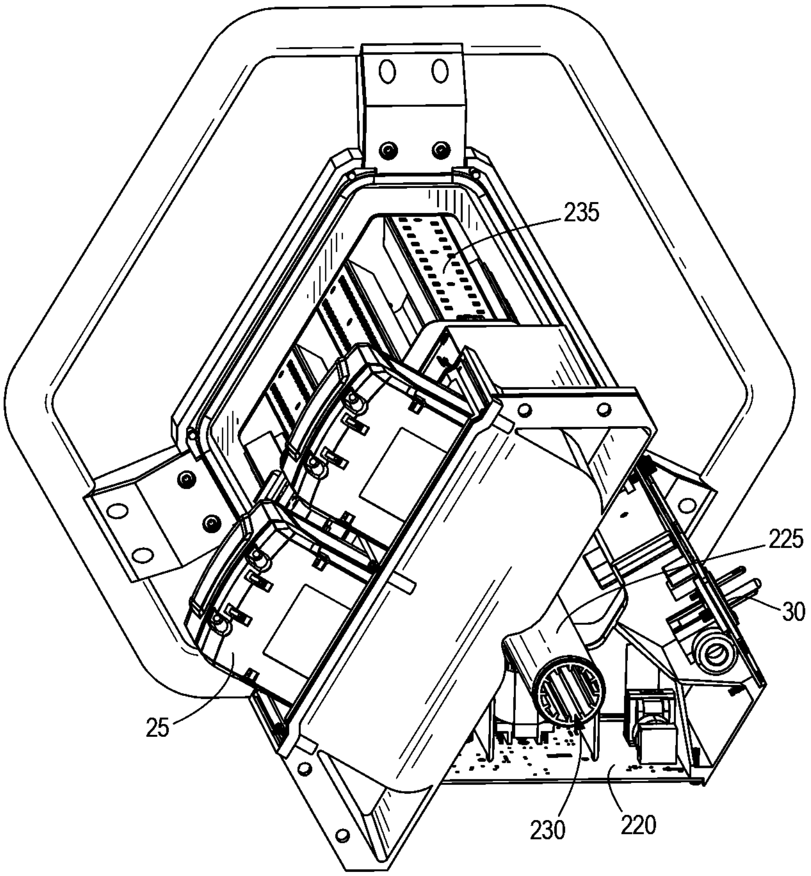
FIG. 16 is an enlarged view of the bottom of the light of FIG. 13.
Figure 17:
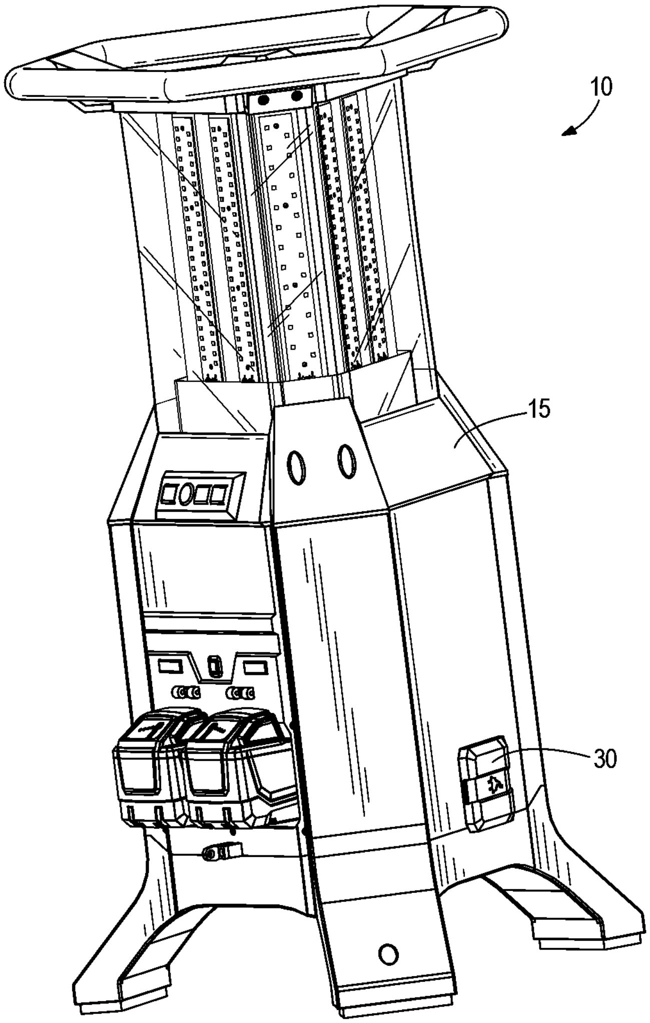
FIG. 17 is a perspective view of the light of FIG. 13.

As illustrated in FIG. 14, circuit boards 220 including the light controls as well as a power control and charging circuits are disposed within the housing 205. In addition, a tube or chimney 225 that at least partially defines a cooling air path 230 extends through the light 200 from the bottom of the housing 205. As shown in FIG. 15, the chimney 225 opens at the bottom of the housing 205 to receive a flow of cooling air. In this arrangement, the legs 210 maintain the position of the opening above the ground to assure that air is free to flow between the legs 210 and into the opening as may be required.

FIGS. 18-22 best illustrate the chimney 225 and a light support member or heat sink 235 of the construction of FIGS. 13-22. As can be seen, the shape and arrangement of these features is different than those of the construction of FIGS. 1-12.

The light support member or heat sink 235 includes a plurality of light support surfaces 240 that are arranged around the perimeter of the light support member 235 and that each support a plurality of LEDs 245 much like the construction of FIGS. 1-12. Specifically, a plurality of circuit boards are attached or bonded to the light support surfaces 240 and are thermally connected to allow the LEDs 245 to emit light outward from the light support member 235 and to allow heat produced by the LEDs 245 to conduct into the light support member 235. The arrangement of the light 200 of FIGS. 13-22 is such that light is emitted in a 360 degree pattern around the light 200. In addition, a flat light support 250 is positioned on top of the light support member 235 and includes a plurality of LEDs 245 arranged to project light upward in a direction substantially parallel to a central axis 255 of the light 200 (i.e., the chimney axis).

Figure 21:
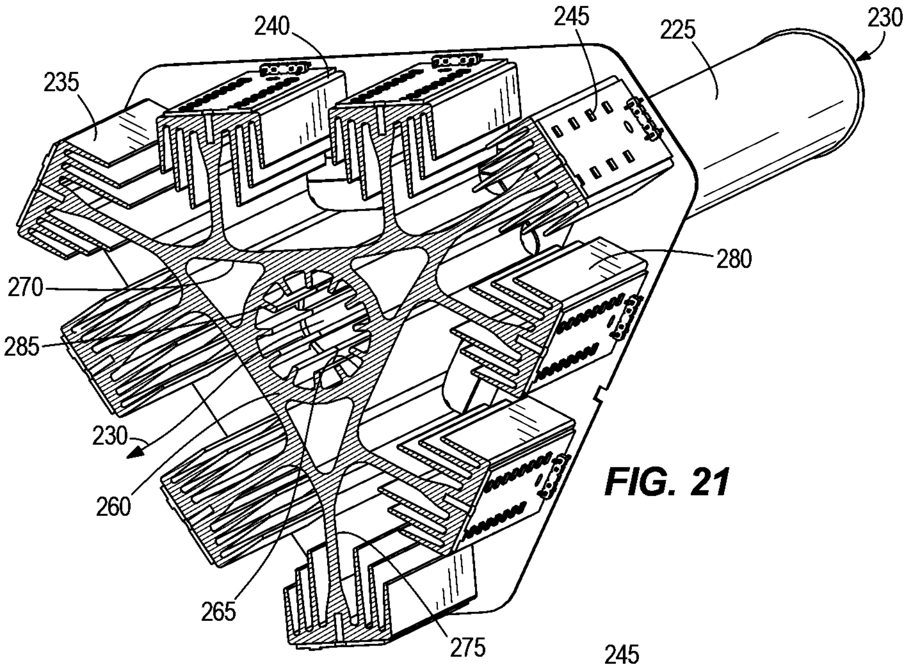
FIG. 21 is a section view of the light support member of FIG. 18 taken along line 21-21 of FIG. 18.
Figure 22:
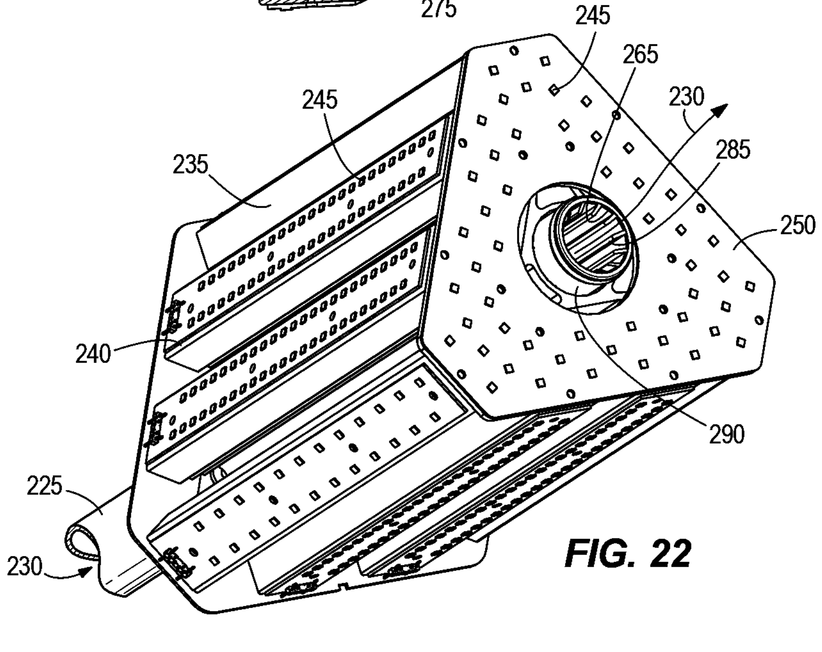
FIG. 22 is a top perspective view of the chimney and light support member of the light of FIG. 13.

With reference to FIG. 21, the light support member or heat sink 235 includes a central body 260 that defines a central aperture 265 and a plurality of external apertures 270. The central aperture 265 and the external apertures 270 extend along parallel offset axes such that they do not intersect and they extend the full length of the heat sink 235. The central body 260 is substantially triangular in cross-section. Each of a plurality of arms 275 extends from the central body 260 and includes one of the light support surfaces 240. In addition, a plurality of fins 280 extends from each of the light support surfaces 240 toward the central body 260 to provide additional surface area for cooling. The triangular shape of the central body 260 provides space for nine arms 275 with two arms 275 extending from each side of the triangular cross section and one arm 275 extending from each vertex. Of course other arrangements of the heat sink 235 are possible.

The central aperture 265 includes a plurality of interior fins 285 that further increase the surface area in the central aperture 265. Additionally, the external apertures 270 provide more surface area that can be utilized to enhance the cooling effect as air passes through the external apertures 270 and the central aperture 265.

While the chimney 100 of the construction of FIGS. 1-12 includes a single tube 100 that extends the full length of the light 10, the construction of FIGS. 13-22 includes a shorter tube 225 that cooperates with the central aperture 145 to complete the cooling flow path 230. The chimney 225, best illustrated in FIG. 19, extends from the bottom of the light 200 to the bottom of the heat sink 235 where it connects to the heat sink 235. In the illustrated construction, the chimney 225 threadably engages the heat sink 235 with other attachment methods also being possible.

Figure 18:
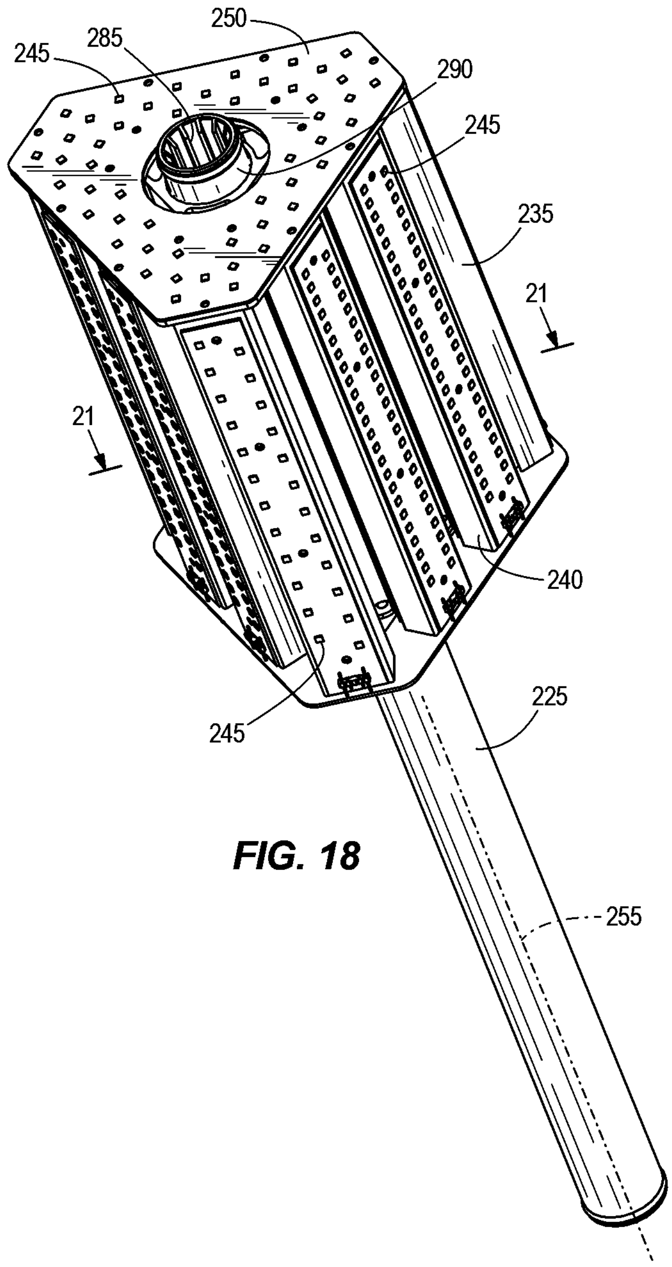
FIG. 18 is a perspective view of a chimney and light support member of the light of FIG. 13.
Figure 19:
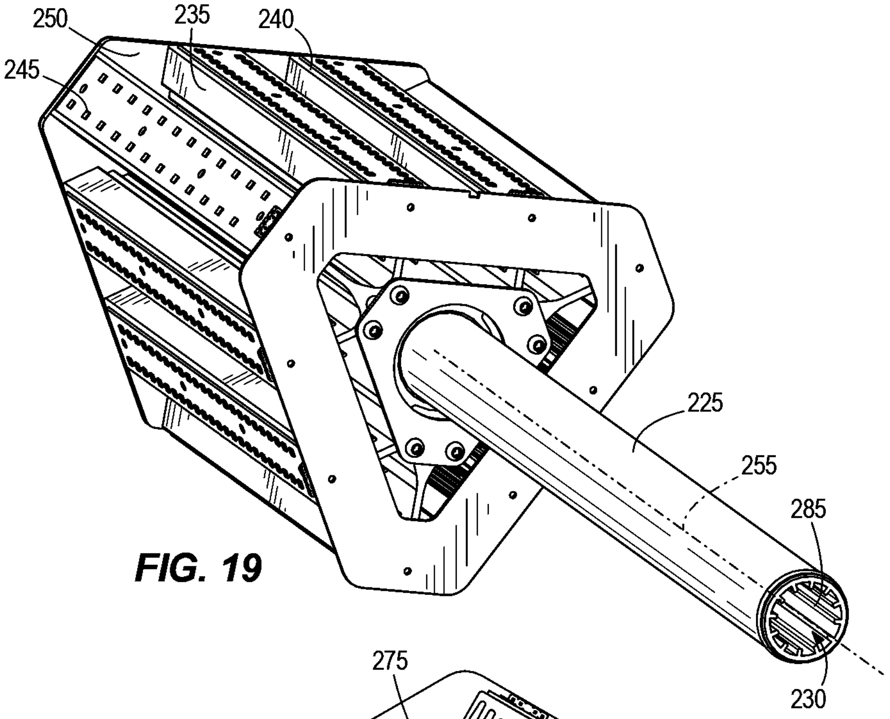
FIG. 19 is a bottom perspective view of the chimney and light support member of the light of FIG. 13.
Figure 20:
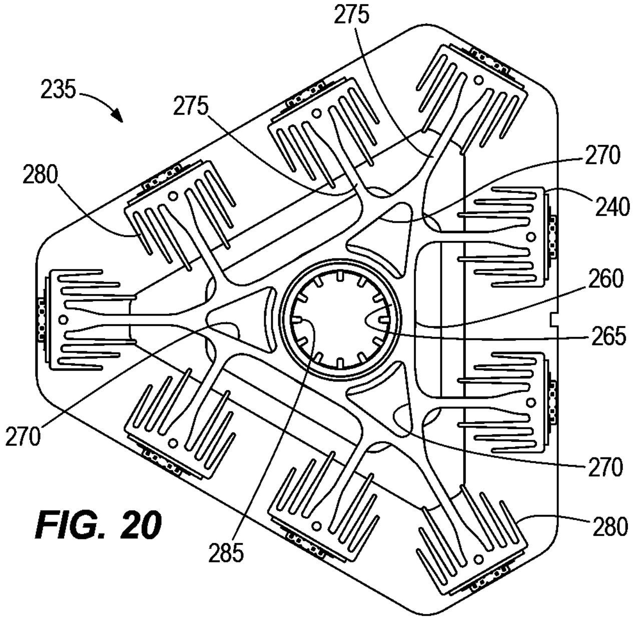
FIG. 20 is a top view of the light support member of FIG. 19.

A shorter tube 290, shown in FIG. 18, is connected to the top of the heat sink 235 to complete the cooling flow path through the light 200. A cap 295 is placed on top of the opened short tube 290 to cover the opening to reduce the likelihood of water entering the cooling flow path 230. As with the larger tube or chimney 225, the short tube 290 threadably engages the heat sink 235. The cap 295 can attach using a simple frictional engagement or can threadably attach to the shorter tube 290 as desired.

In operation, the user uses a power button 55 to actuate the light 200 and select an operating mode. The power control circuit or charging circuit 40 determines where power for the LEDs 245 should come from. First the power control circuit 40 determines if AC power is available from an external source. If AC power is not available, the power control circuit 40 will use the battery packs 25 if they are positioned in the battery pack ports 20. If only one battery pack 25 is present, power will be drawn from that battery pack 25. If two battery packs 25 are present, the power control circuit 40 first determines the state of charge for each of the battery packs 25 and then selects the battery pack 25 with the lowest state of charge to deliver power to the LEDs 245 much like the embodiment of FIGS. 1-12.

As the LEDs 245 operate, they emit light and produce heat. The heat conducts into the heat sink 235 and increases the temperature of the heat sink 235. The higher temperature of the heat sink 235 heats the air within the central aperture 265, the external apertures 270, and the air around the various fins 280. As the air is heated it rises, thereby producing a natural convection current through the heat sink 235. In the natural convection current, cool air enters the cooling flow path through the bottom opening in the tube or chimney 225. The air rises through the tube 225, through the central aperture 265, into the short tube 290 and out the top of the light 200 to complete the cooling flow path. Similarly, air flows through the external apertures 270 and the various fins 280 from the bottom of the heat sink 235 to the top of the heat sink 235 to enhance the cooling ability of the heat sink 235.

Figure 23:
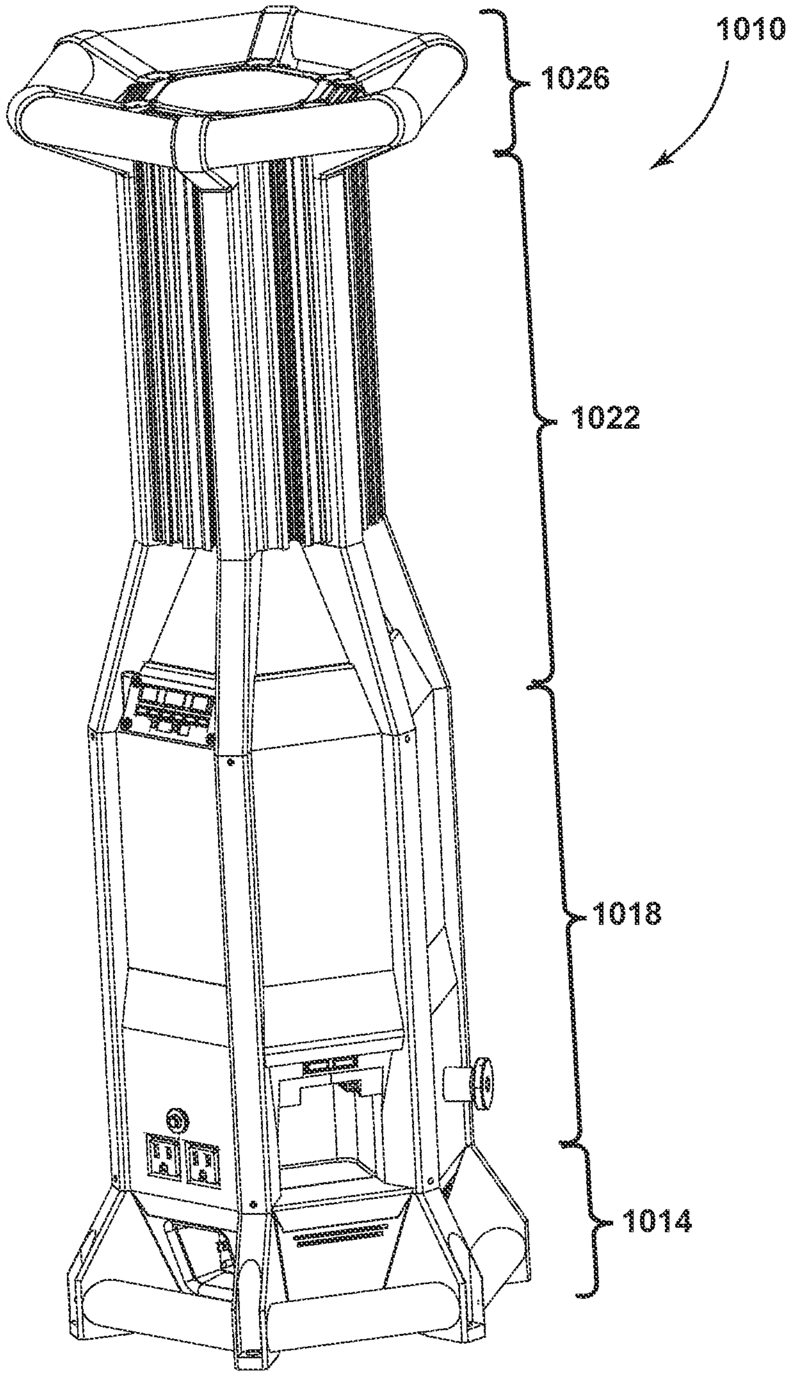
FIG. 23 is a perspective view of a light in accordance with another embodiment of the invention.

FIG. 23 illustrates an area light 1000 that is operable under either AC power or DC power. The illustrated area light 1000 includes a foot 1014, a base 1018, a body 1022, and a head 1026. The foot 1014 forms a platform that supports the base 1018 and the remainder of the area light 1010. The body 1022 is positioned above the base 1018 and is supported by the base 1018. The head 1026 extends from the body 1022 and forms the topmost portion of the area light 1010.

Figure 24:
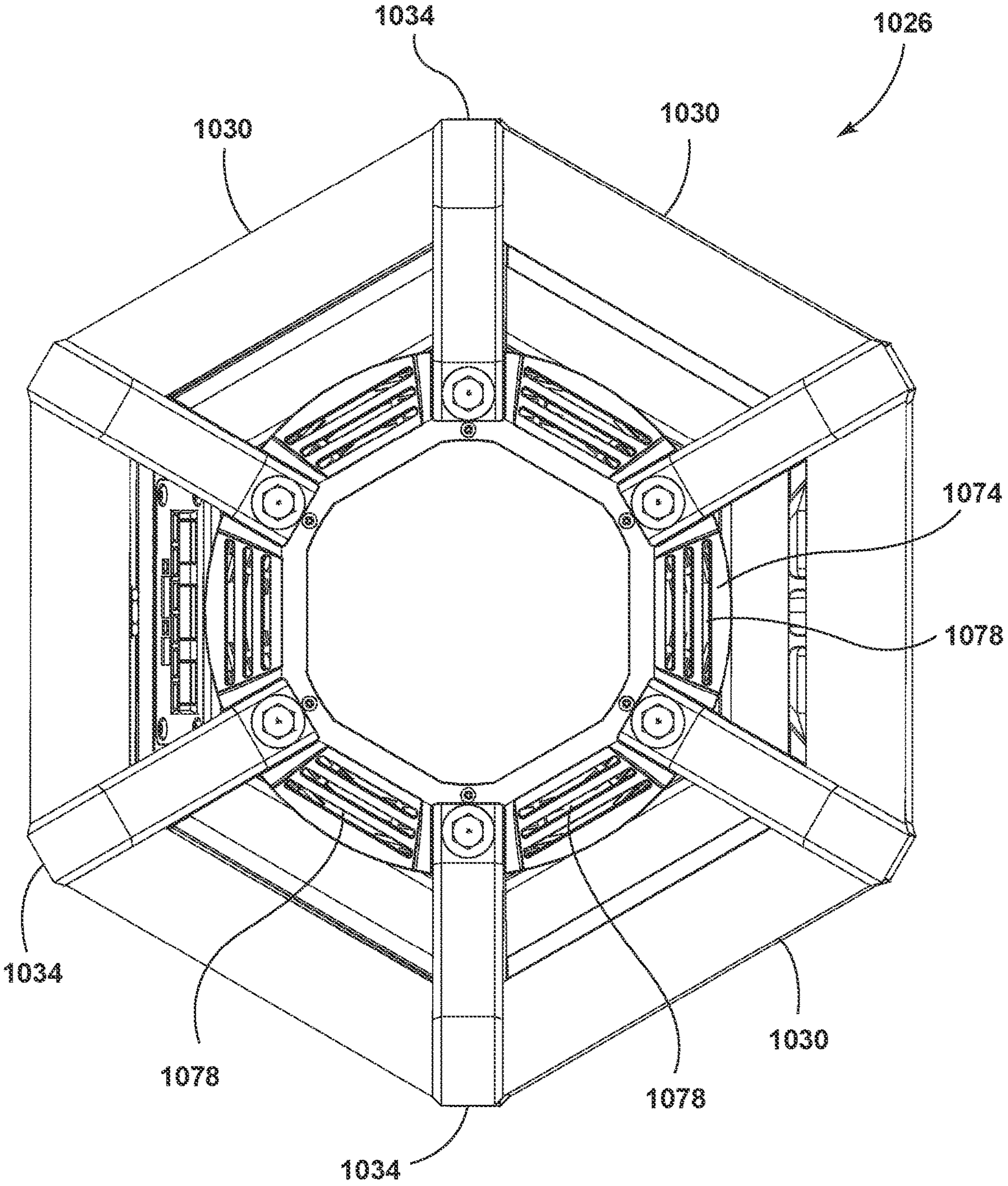
FIG. 24 is a top view of the area light of FIG. 23.
Figure 25:
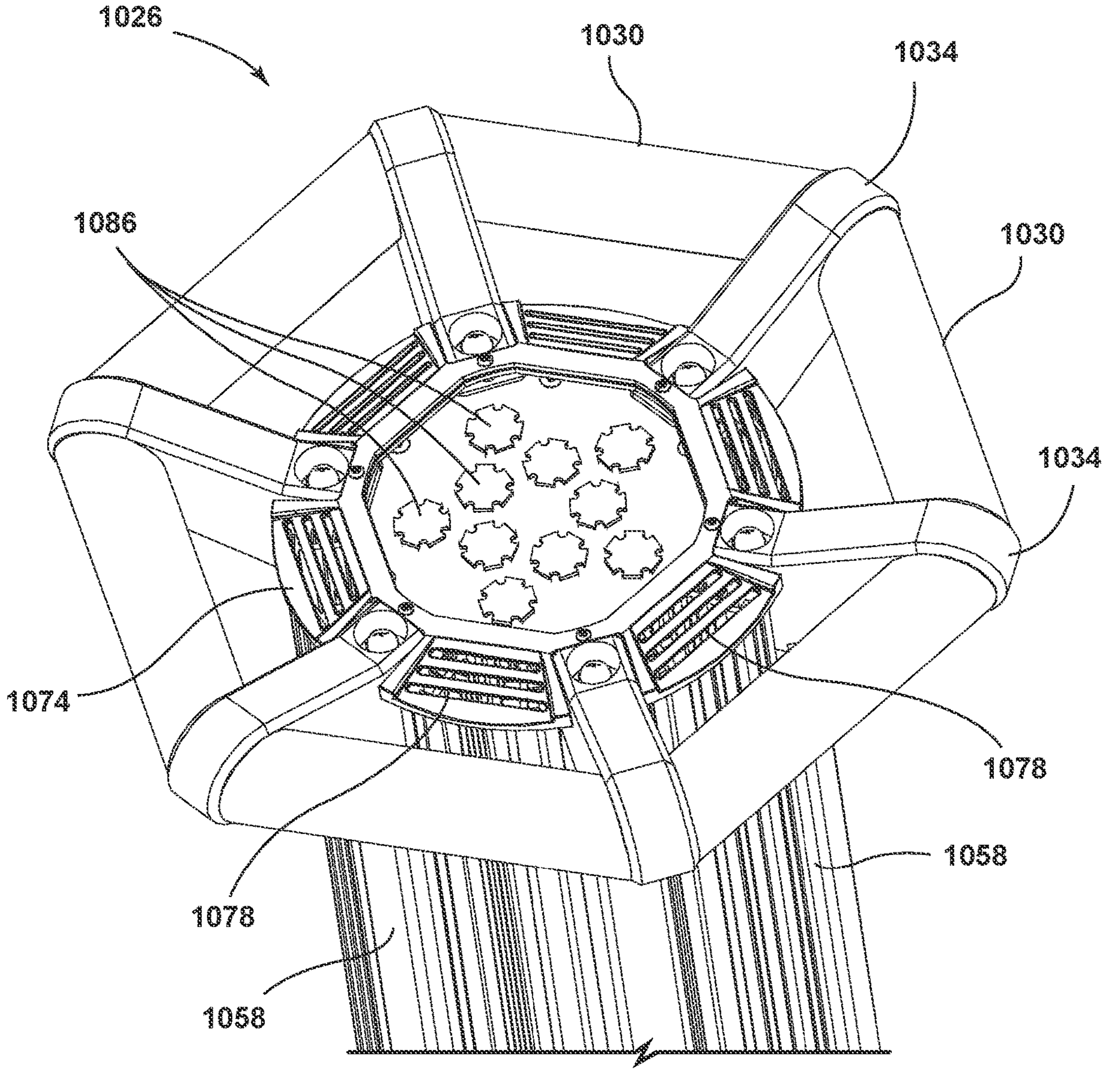
FIG. 25 is a top perspective view of the area light of FIG. 23.

FIGS. 24-25 better illustrate the head 1026, which is hexagonally shaped and includes six tubes 1030 connected by six arms 1034. The arms 1034 extend radially inward to couple the head 1026 to the body 1022. As shown in FIG. 24, the foot 1014 similarly defines a hexagonal shape that includes six tubes 1038 connected by six legs 1042. The legs 1042 couple the foot 1014 to the base 1018. The tubes 1038 of the foot 1014 and the tubes 1030 of the head 1026 can be used as carrying handles when transporting the area light 1010. The foot 1014 and the head 1026 can take on other shapes, for example, a circle, square, or octagon as may be desired.

With reference to FIGS. 27-30, the body 1022 includes a main housing 1050, a plurality of lights 1054, a plurality of heat sinks 1058, a plurality of spacers 1064, and a central tube 1062. The main housing 1050 extends vertically from the base 1018 to the head 1026 and includes a cylindrical upper portion 1066 and a sloping or frustoconical lower portion 1060. The main body 1022 is hollow and partially houses the central tube 1062. The central tube 1062 extends vertically from the body 1022 into the base 1018 and provides structural support for the area light 1010 as well as some heat dissipating capacity. The lower portion 1060 is wider than the upper portion 1066 near the base 1018 and narrows into the upper portion 1066. The lower portion 1060 includes six ribs 1070 spaced around the circumference of the area light 1010 to define six slots 1068 with each slot 1068 being wide at its lower portion 1060 and narrowing as it approaches the upper portion 1066. Each of the spacers 1064 sits on one of the ribs 1070 and extends vertically upward to separate the slots 1068 in the upper portion 1066.

Figure 30:
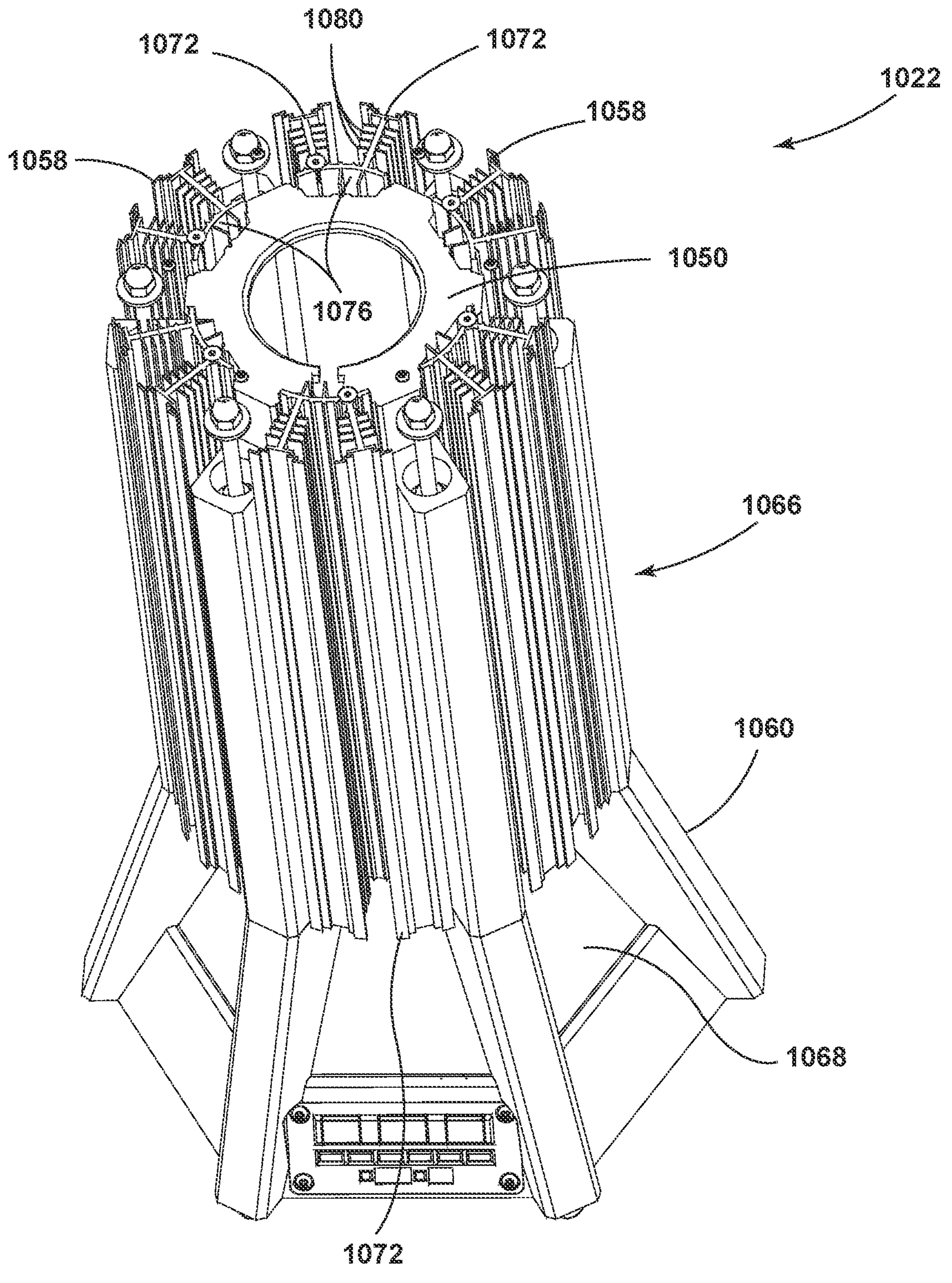
FIG. 30 is a perspective view of the main body of the area light of FIG. 23, including the heat sinks.
Figure 31:
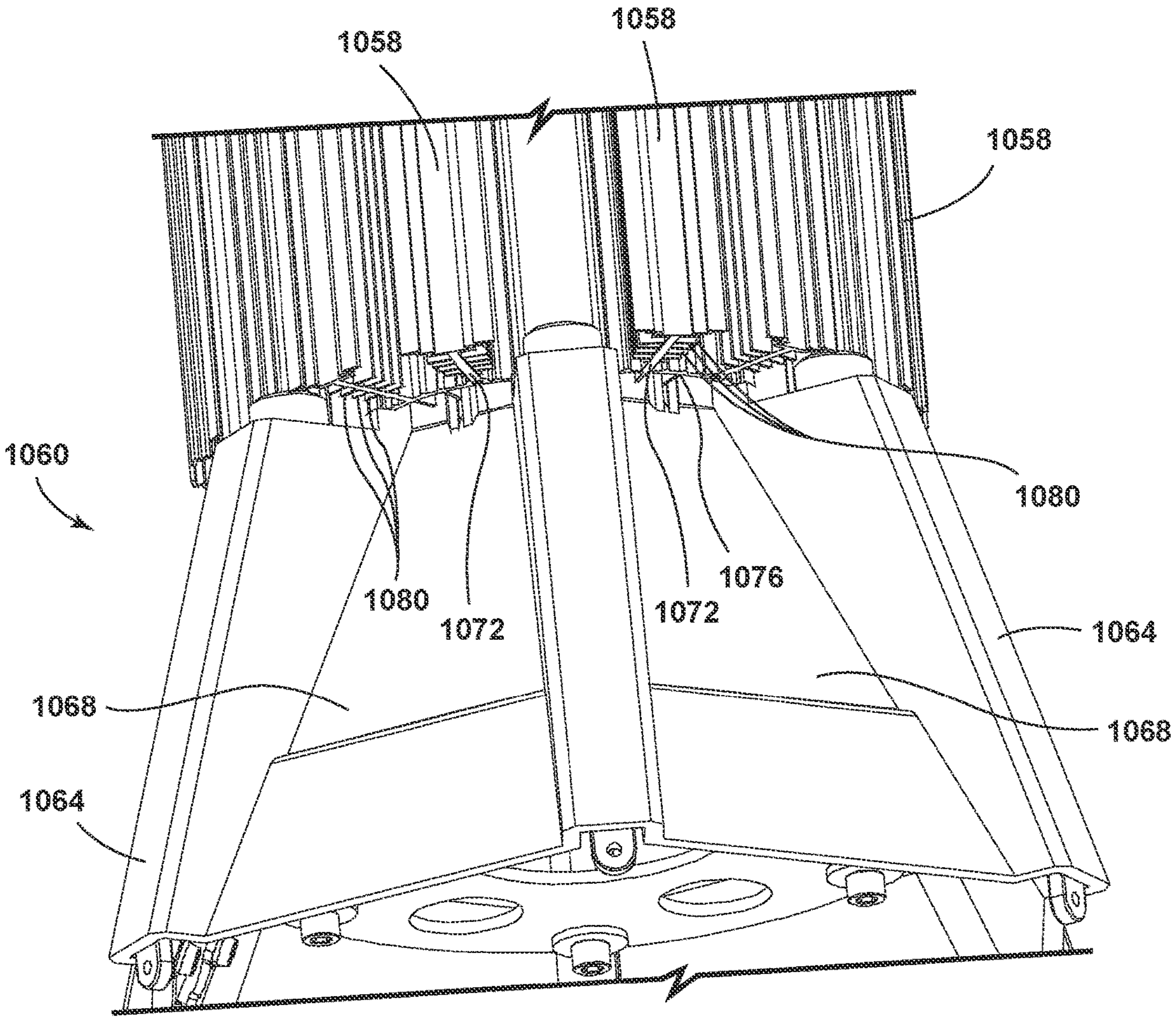
FIG. 31 is a close-up view of the heat sinks of FIG. 30.

With reference to FIG. 30, the heat sinks 1058 are positioned around the upper portion 1066 of the main housing 1050 of the body 1022. The heat sinks 1058 connect to the main housing 1050 and extend parallel to one another in a vertical direction with each heat sink 1058 disposed within one of the slots 1068 adjacent the upper portion 1066 of the main housing 1050. Each heat sink 1058 includes an arcuate plate 1076 that supports two radially extending legs 1072. At the end of each leg 1072 a light receiving structure is formed. In the illustrated construction, the light receiving structure includes a slot sized to receive the individual lights. A plurality of fins 1080 extend from each of the legs 1072 to provide increased surface area for the heat sinks 1058. An annular disk 1074, best illustrated in FIGS. 24-25 covers the top of the heat sinks 1058 and includes slotted vents 1078 arranged above each of the heat sinks 1058. The heat sinks 1058 absorb some of the heat produced by the lights 1054 to help keep the lights and the internal components of the area light 1010 cool.

Figure 32:
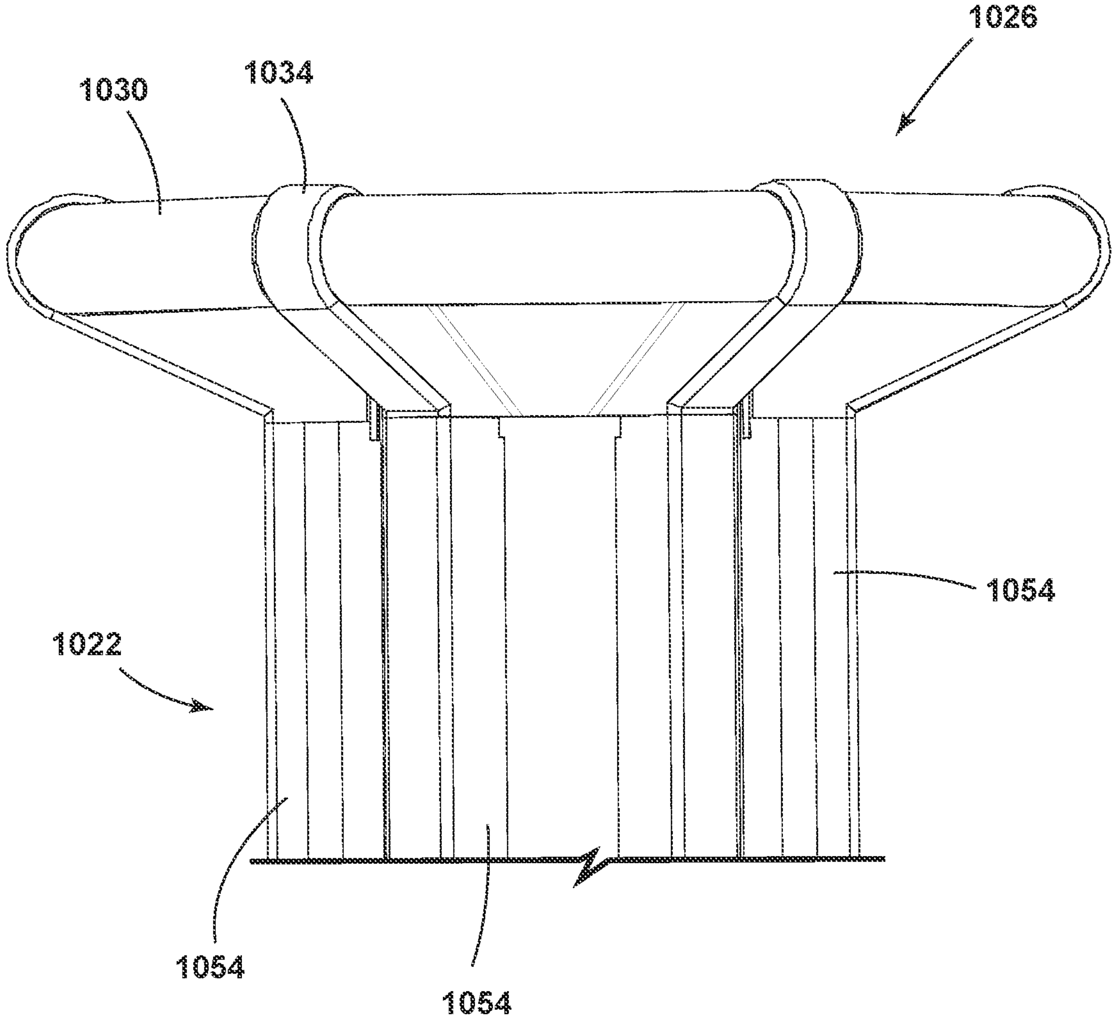
FIG. 32 is a close-up view of a portion of the area light of FIG. 23 better illustrating the lights.
Figure 33:
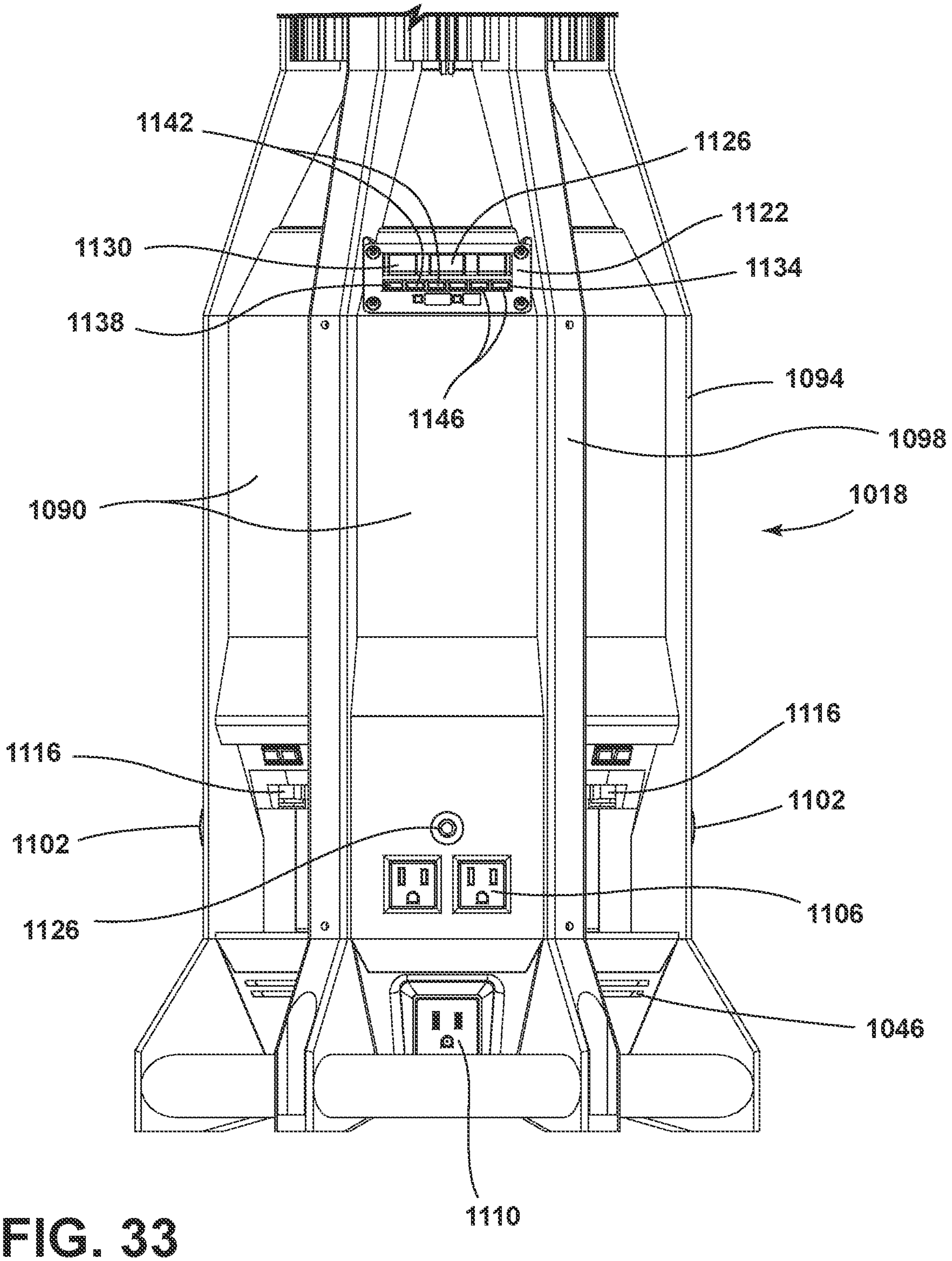
FIG. 33 is an enlarged view of a base of the area light of FIG. 23.
Figure 34:
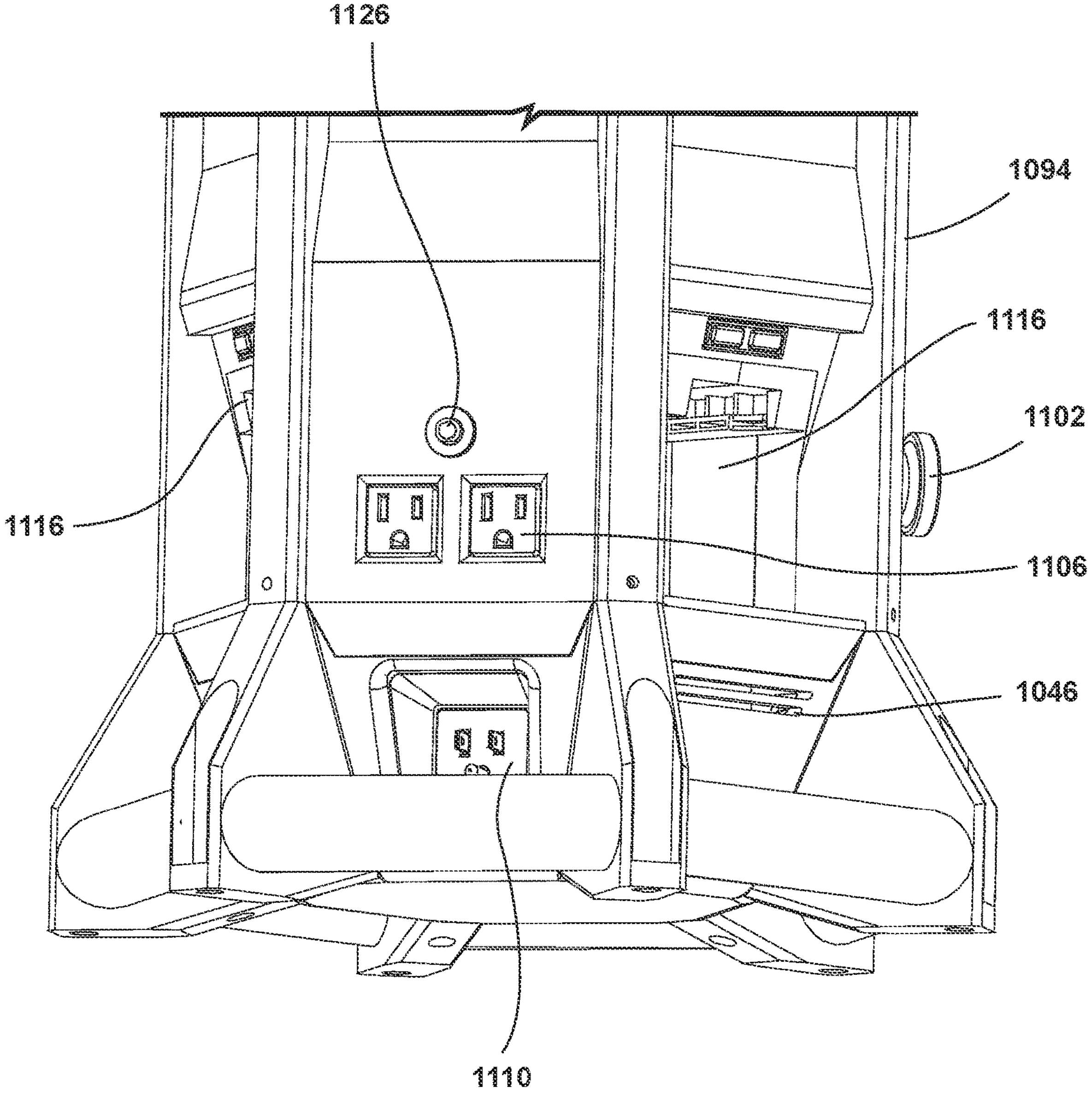
FIG. 34 is a perspective view of the base of the area light of FIG. 23.
Figure 35:
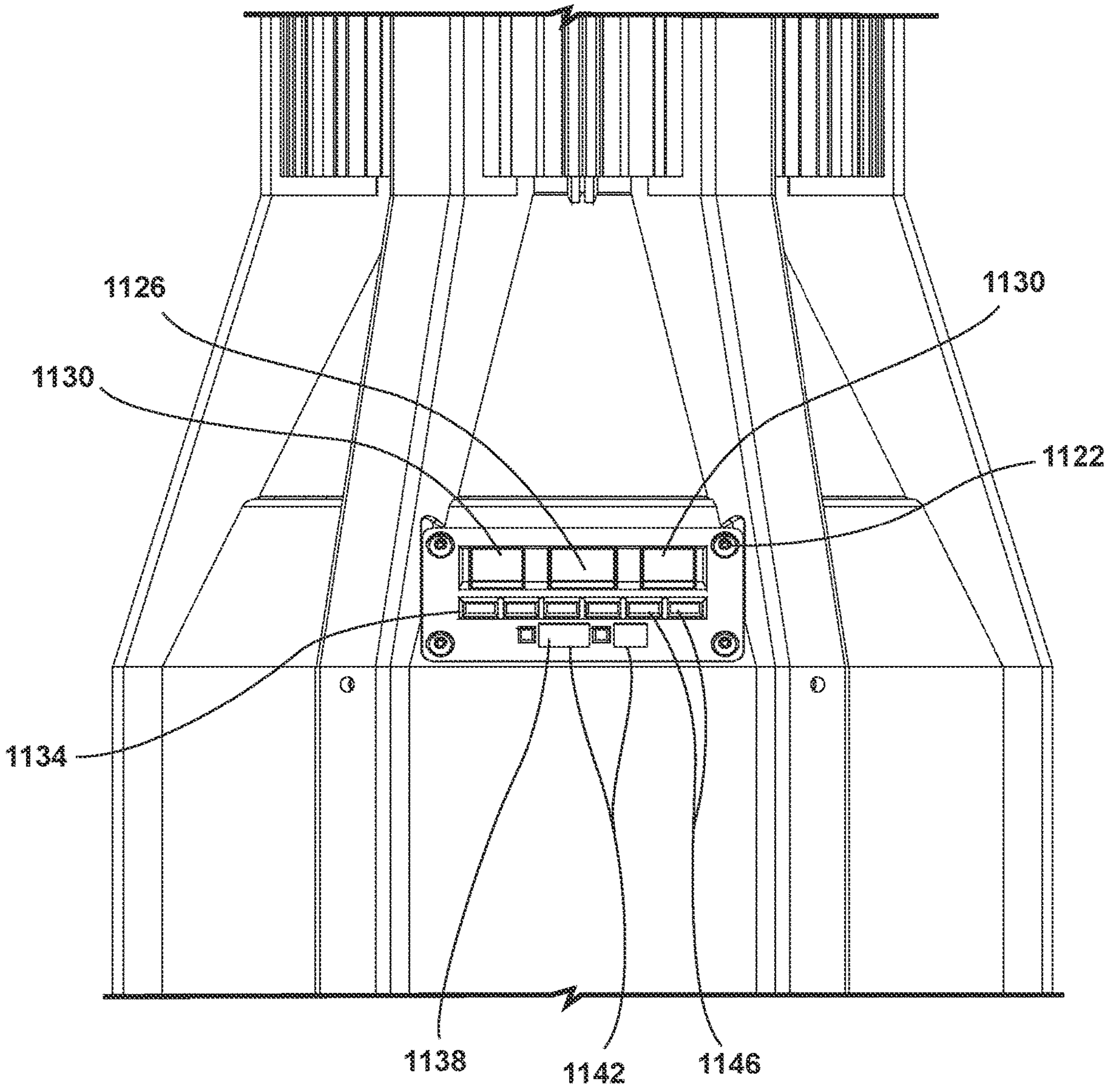
FIG. 35 is a close-up view of a control panel of the area light of FIG. 23.
Figure 36:
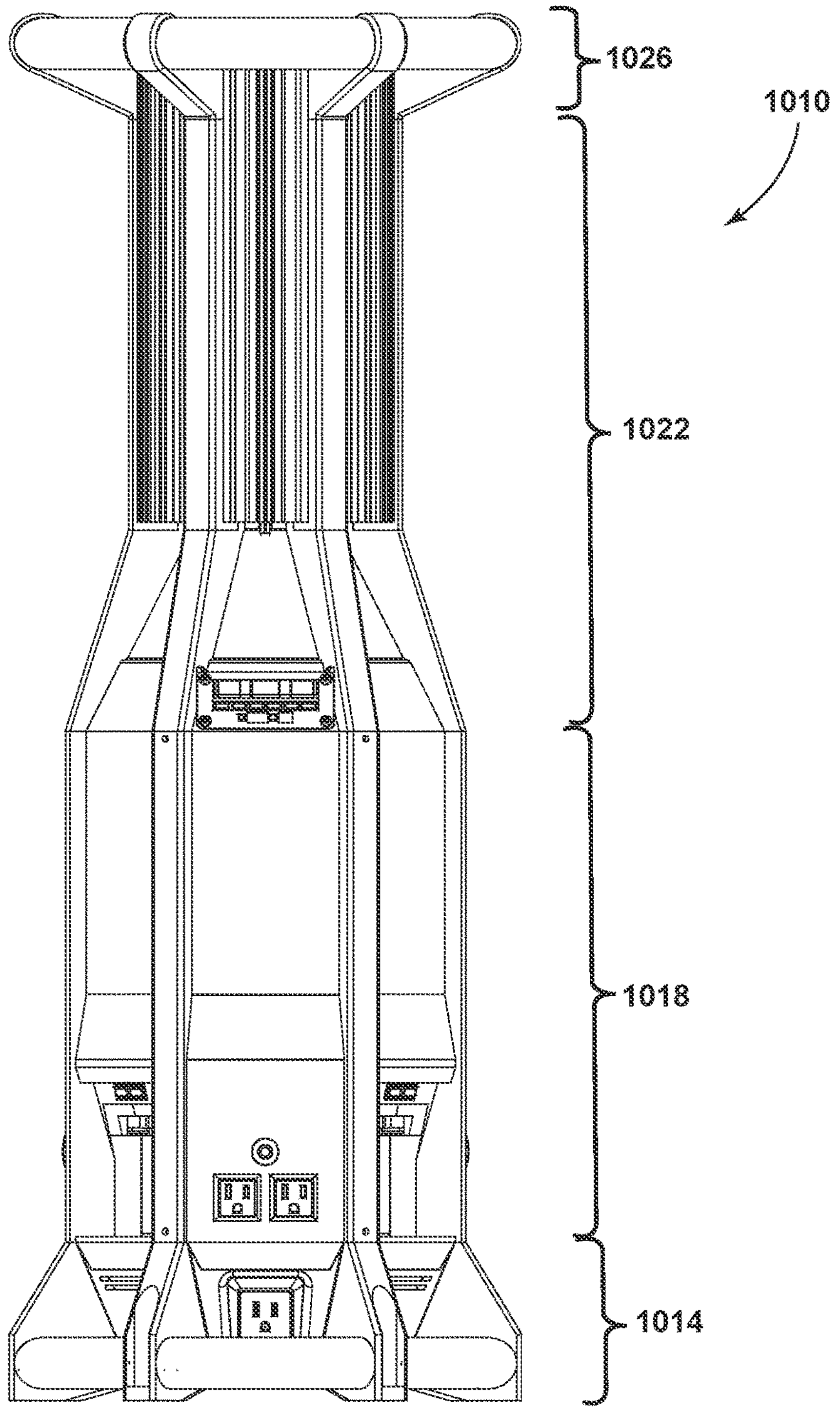
FIG. 36 is a front view of the area light of FIG. 23.
Figure 37:
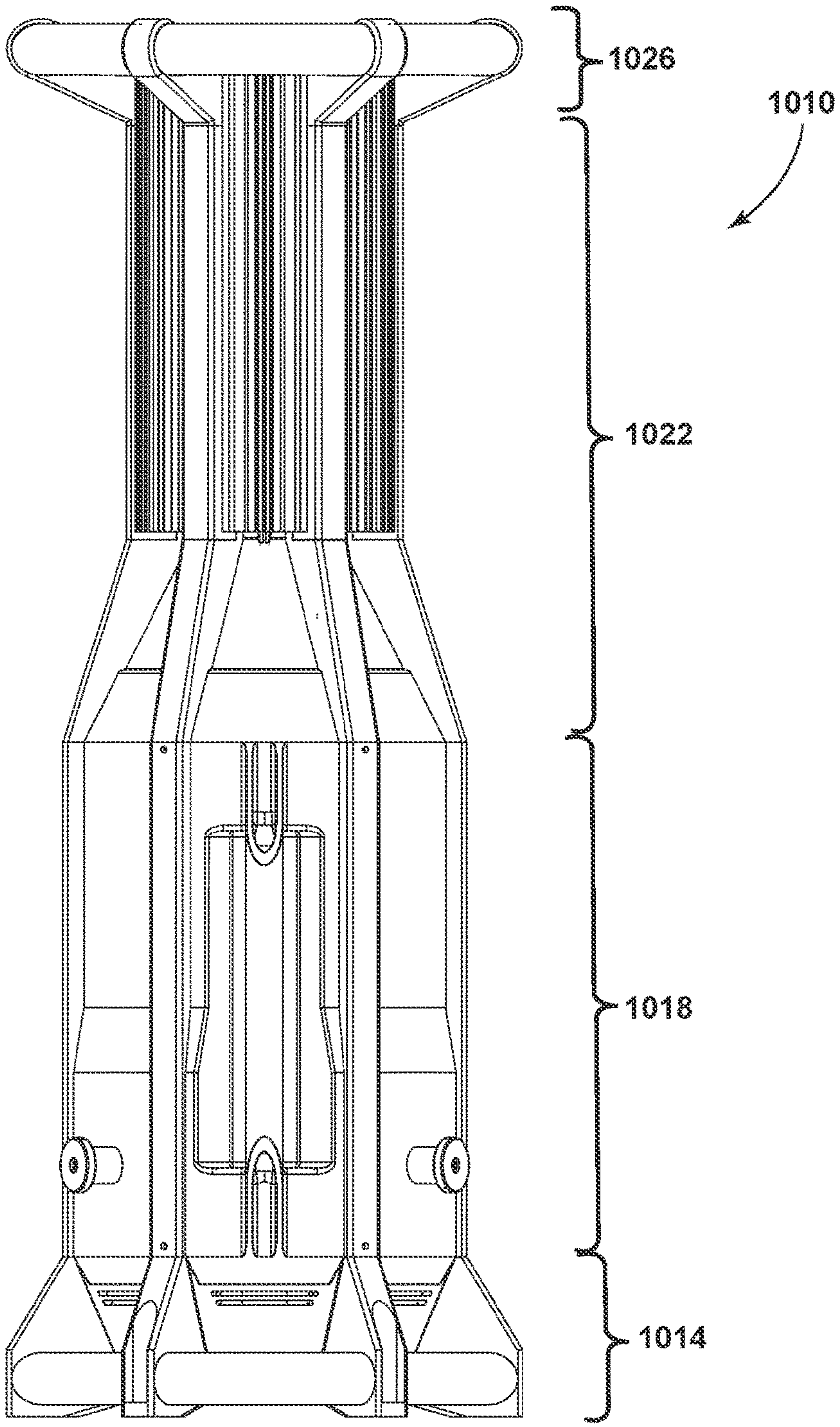
FIG. 37 is a rear view of the area light of FIG. 23.
Figure 38:
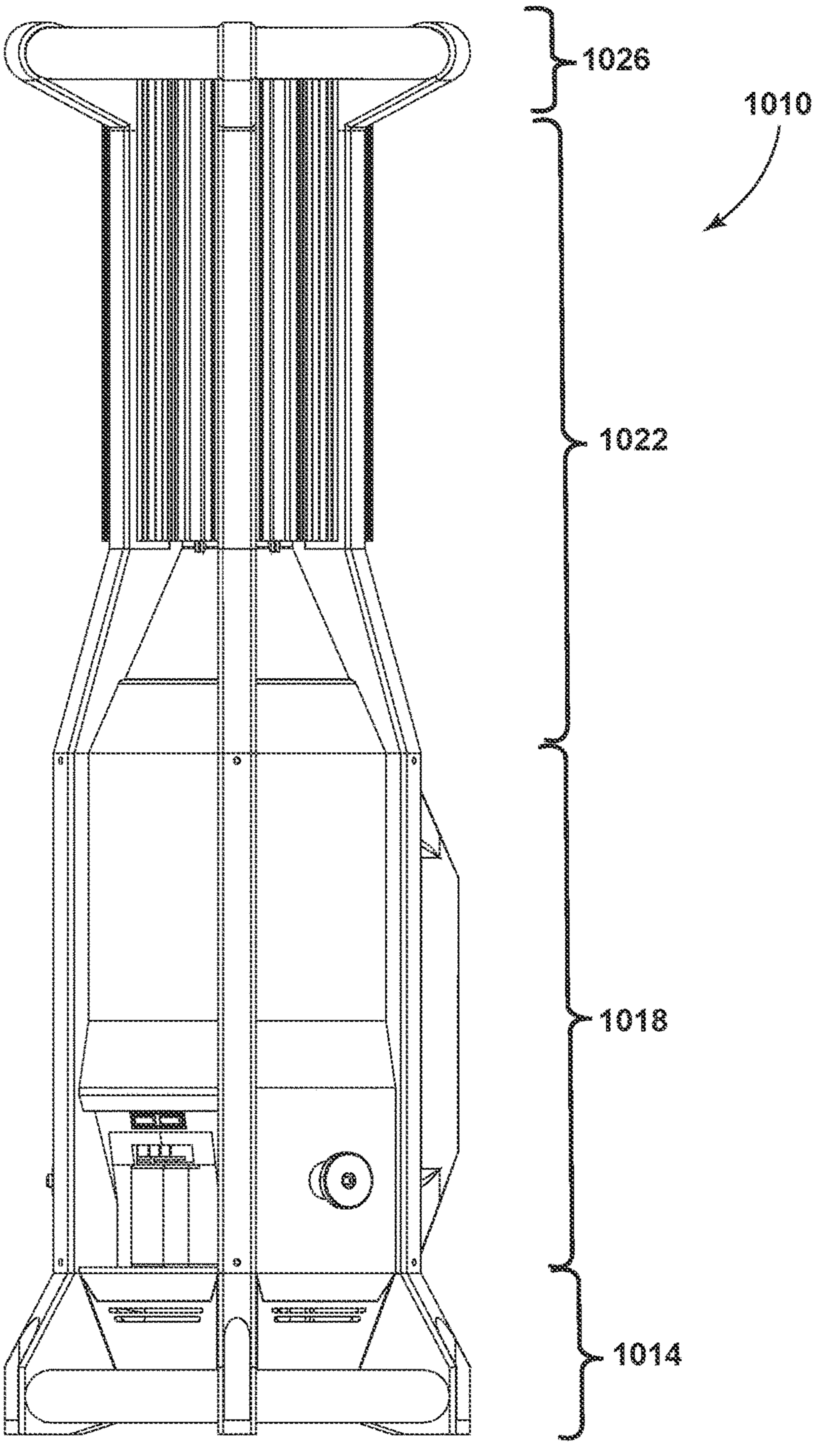
FIG. 38 is a right side view of the area light of FIG. 23.
Figure 39:
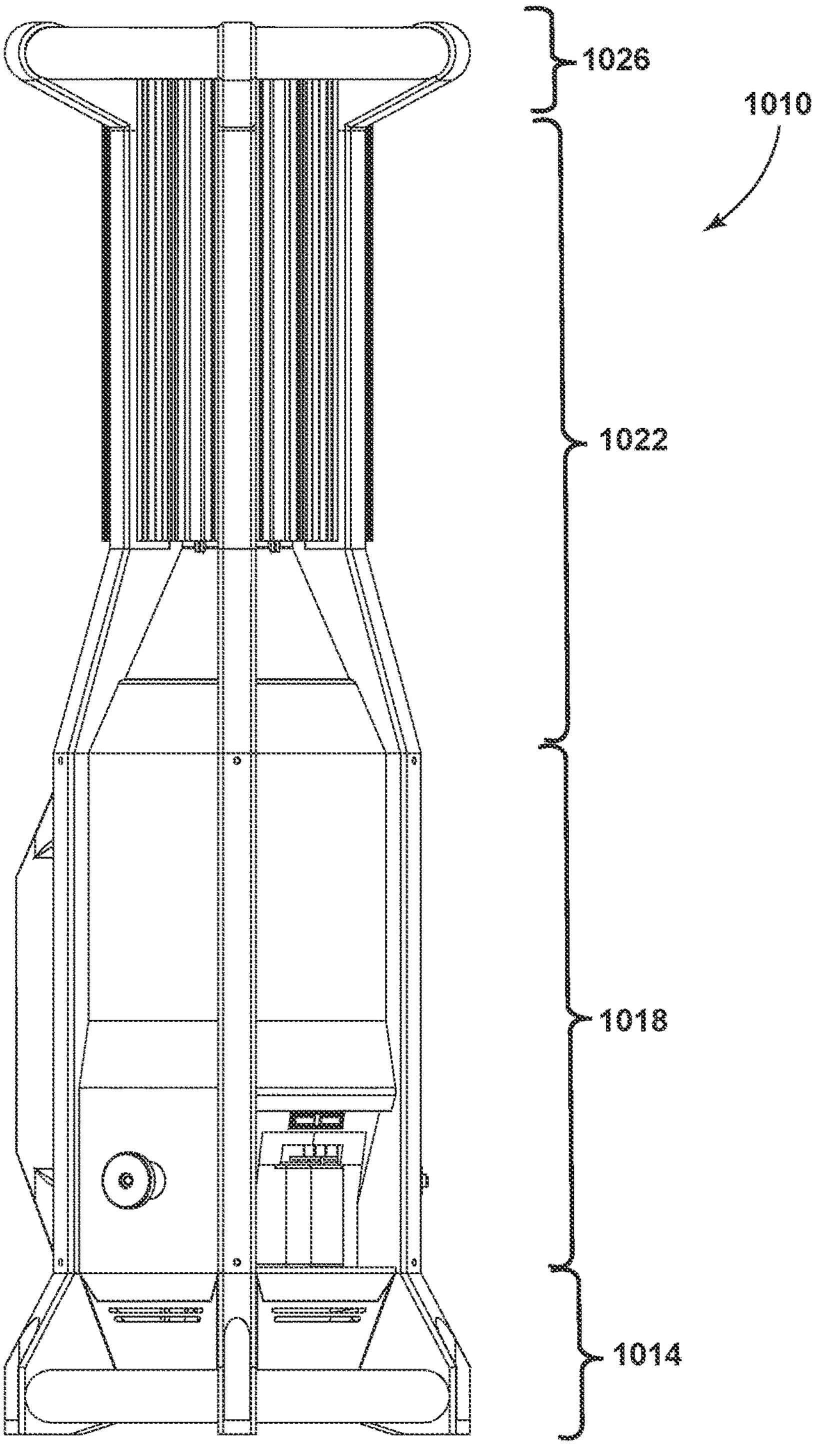
FIG. 39 is a left side view of the area light of FIG. 23.
Figure 40:
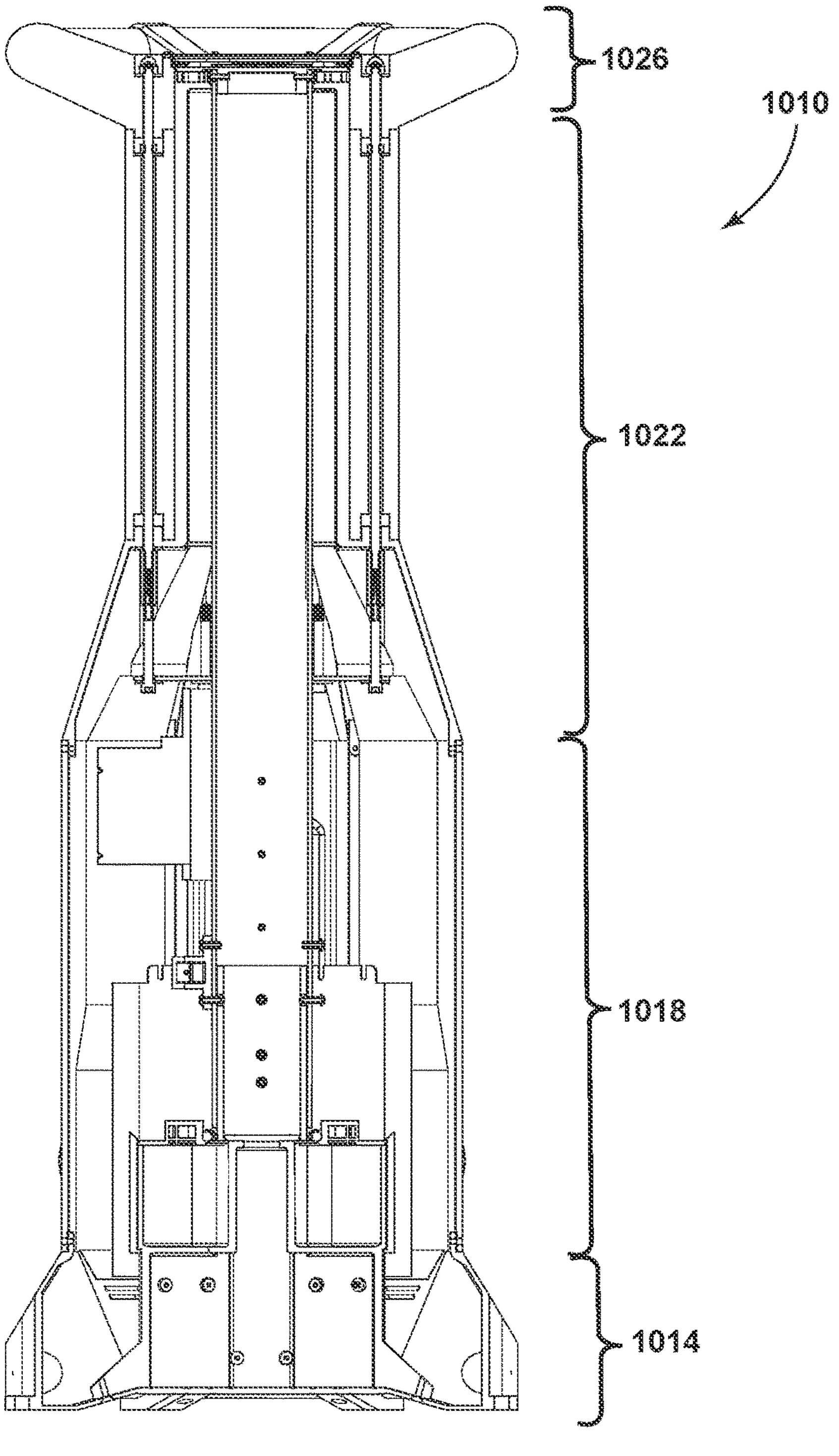
FIG. 40 is a cross-sectional view of the light of FIG. 23.
Figure 41:
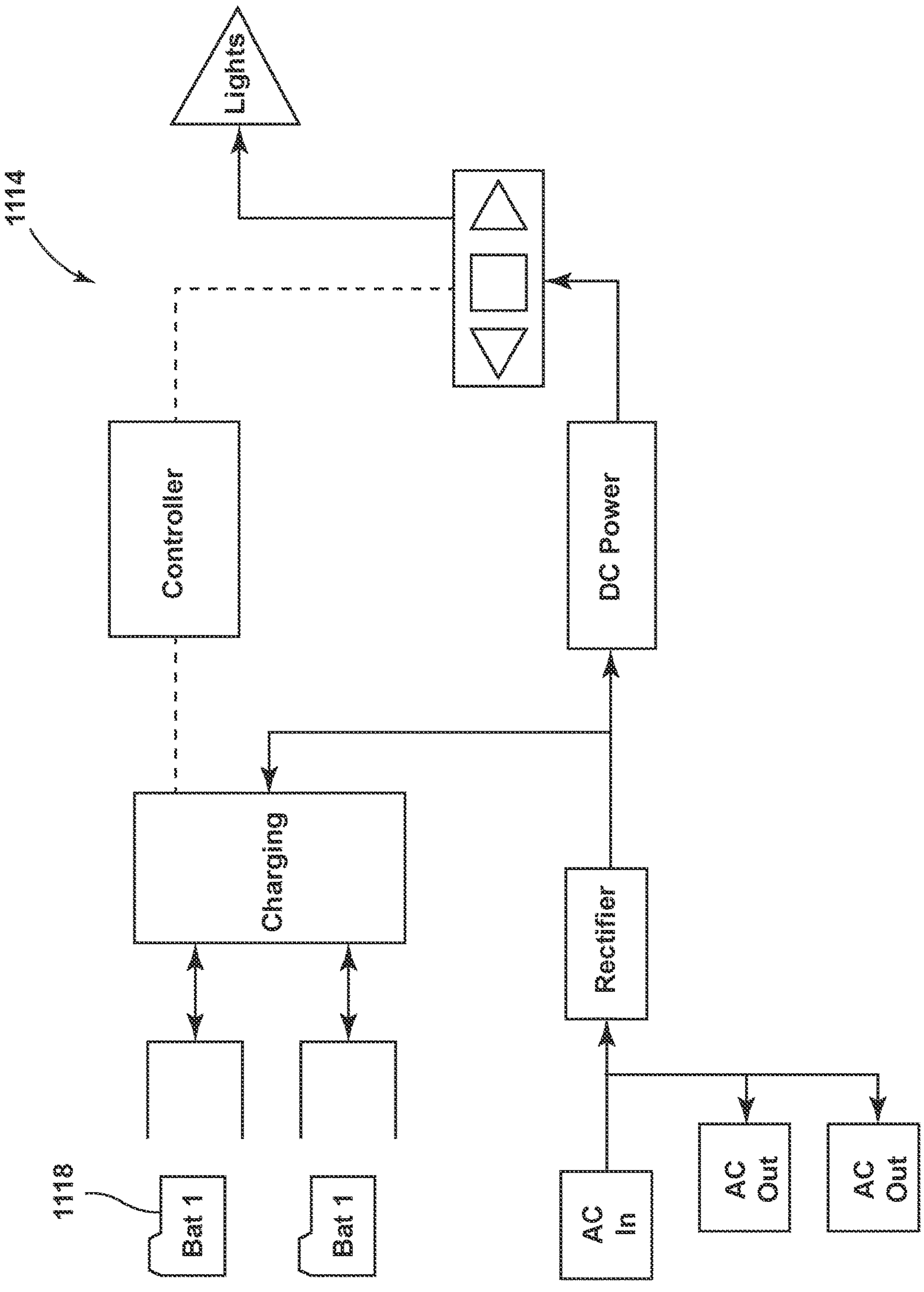
FIG. 41 is a schematic drawing of a power distribution circuit.

As illustrated in FIG. 32, the plurality of lights 1054 include a plurality of individual LEDs arranged on an elongated strip that is sized to be supported by one of the heat sinks 1058 in one of the slots 1072. In preferred constructions, the strip includes a circuit board that provides the necessary electrical connections to each of the individual LEDs and also thermally couples the LEDs and/or the circuit board to the heat sinks 1058. As shown in FIG. 32, the strips supporting the LEDs extend parallel to one another and parallel to the heat sinks 1058 in a vertical direction. While LEDs are used in the illustrated construction, other types of lights could be used in place of or in conjunction with LEDs if desired.

As illustrated in FIG. 25, the illustrated area light 1010 also includes a series of lights 1086 (preferably LEDs) disposed above the heat sinks 1058 and arranged to emit light upward. The LEDs 1086 are coupled to a metallic plate that is thermally coupled to the heat sink to provide cooling.

Figure 26:
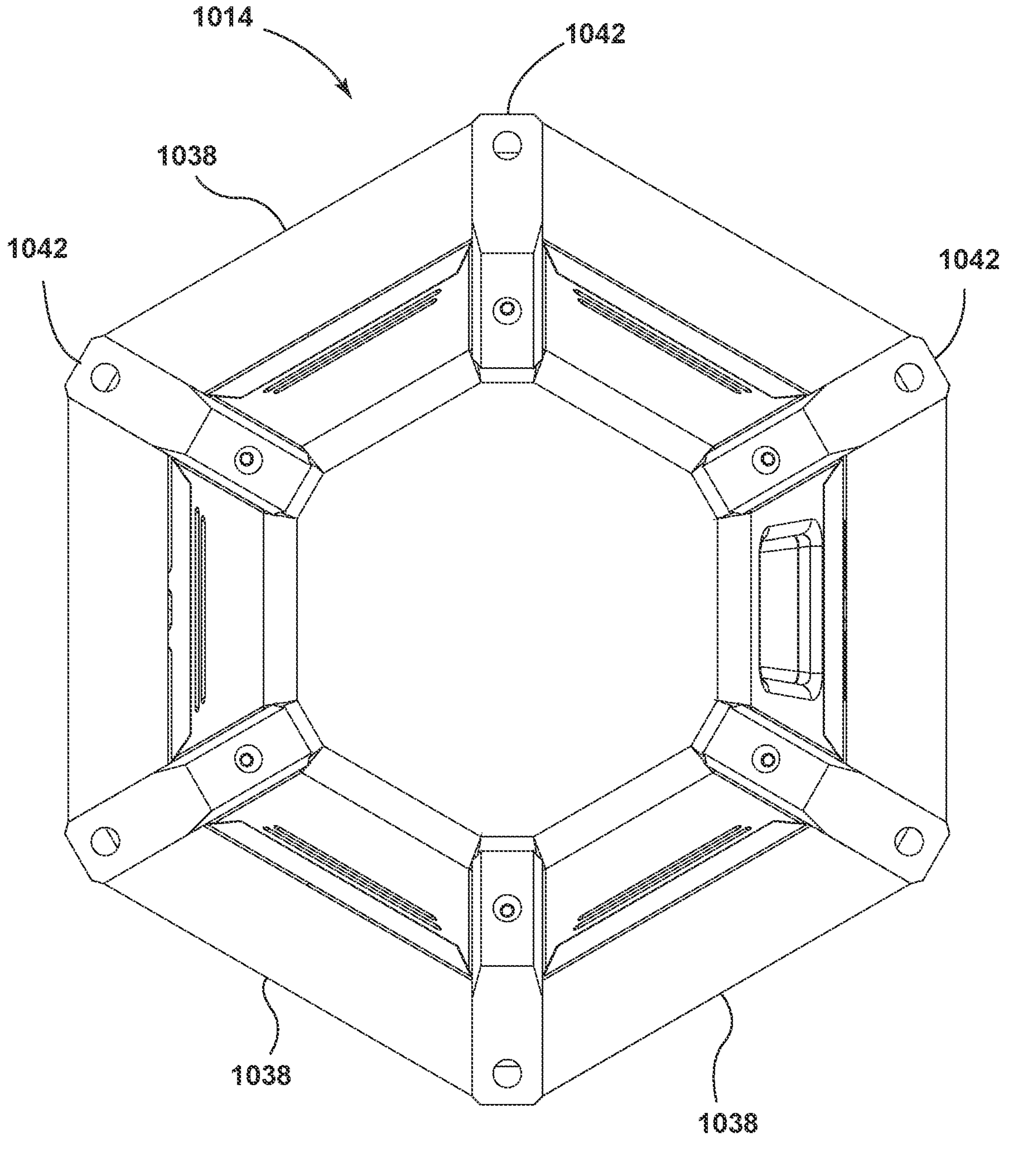
FIG. 26 is a bottom view of the light of FIG. 23.
Figure 27:
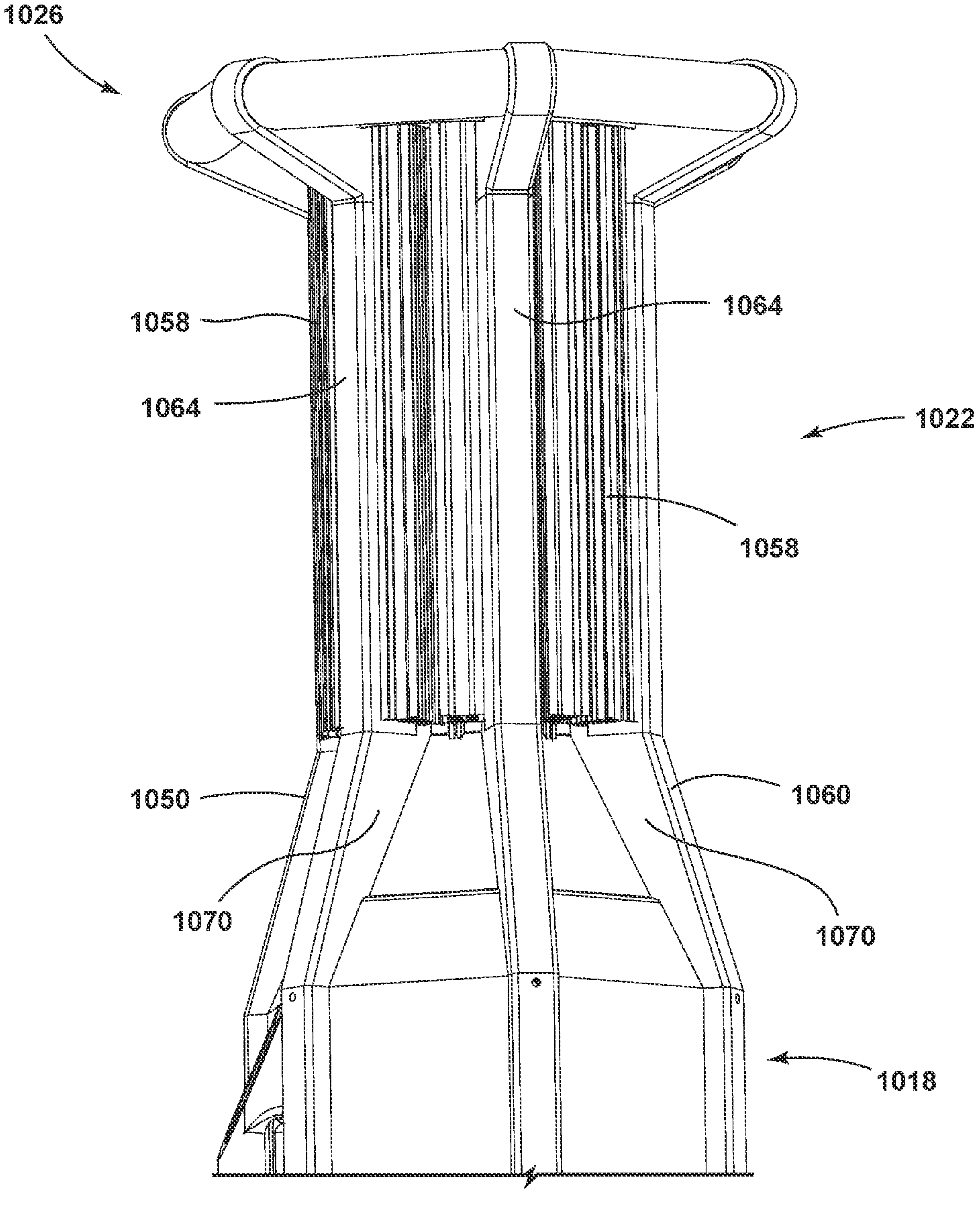
FIG. 27 is a perspective view of a body of the area light of FIG. 23.
Figure 28:
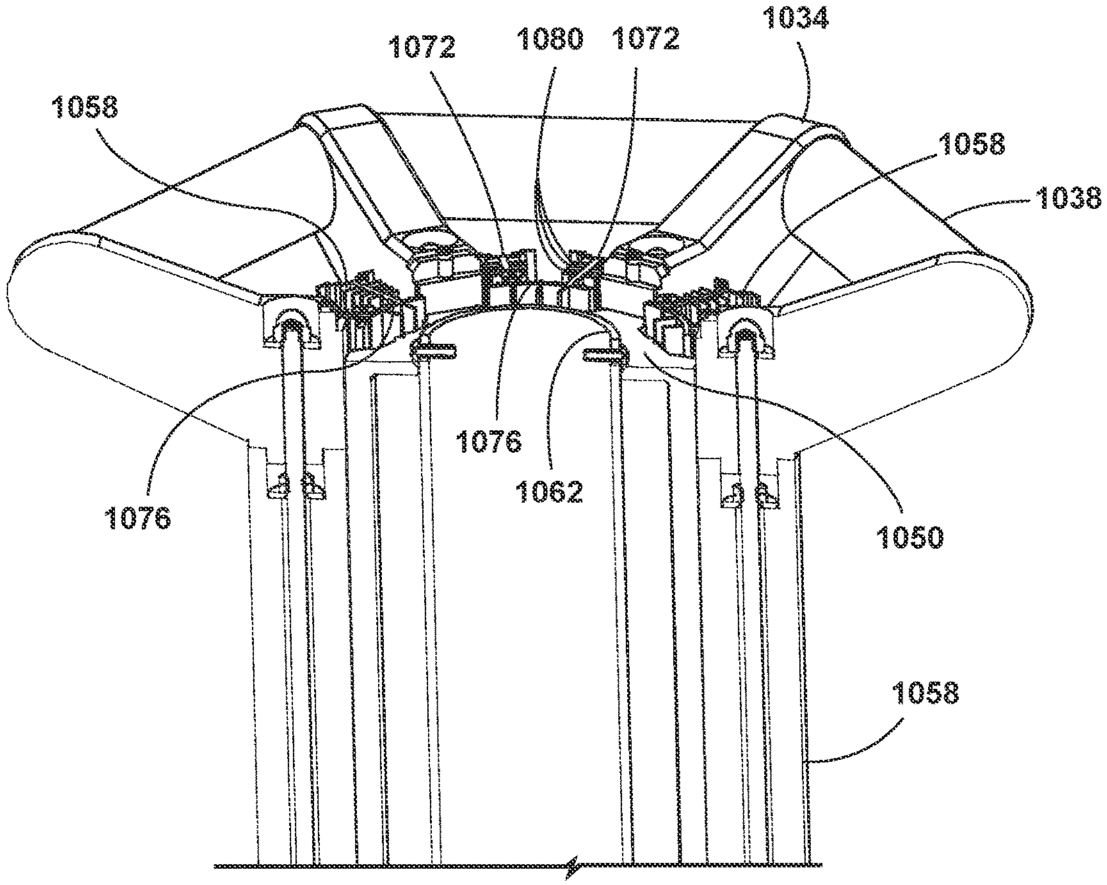
FIG. 28 is a cross-sectional view of the area light of FIG. 23 with the central tube and heat sinks exposed.
Figure 29:
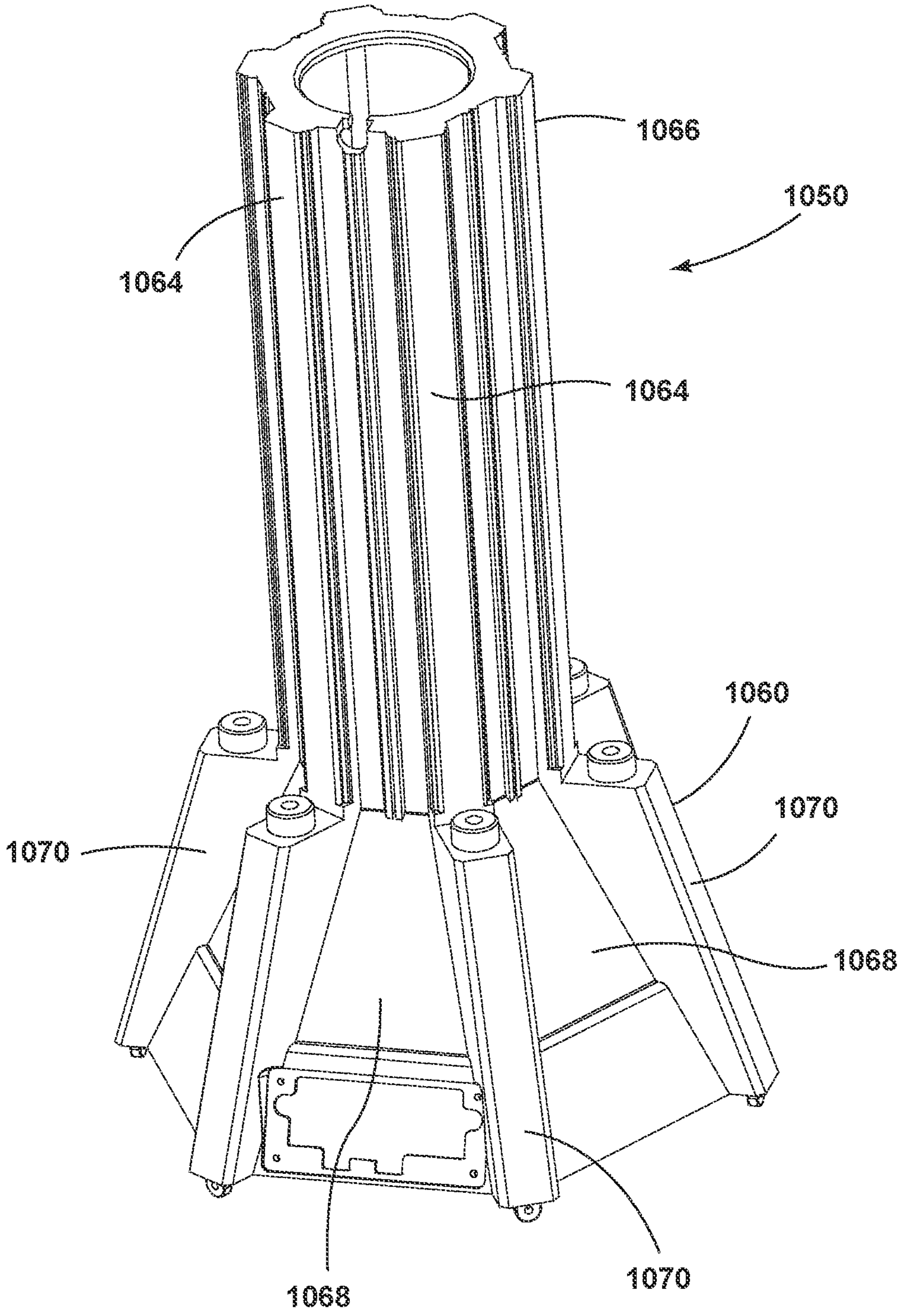
FIG. 29 is a perspective view of a main body of the area light of FIG. 23.

With reference to FIGS. 25-26, the base 1018 extends from the body 1022 to the foot 1014. The base 1018 includes panels 1090 that form a generally hexagonal frame 1094. In some embodiments, the base 1018 includes an elongated handle 1098 disposed on the frame 1094 and extending along one of the panels 1090 of the frame 1094. In some embodiments, the base 1018 includes two projections 1102 coupled to the exterior of the frame 1094. The illustrated projections 1102 are cord wraps that allow an electrical cord to be wrapped around the two projections 1102 when the area light 1010 or the cord are not in use.

The base 1018 houses electrical components of the area light 1010. As shown in FIGS. 25-26, the base 1018 includes an AC power input 1106, AC power outlets 1110, and rechargeable battery slots 1116. The power input 1106 connects the area light 1010 to an AC power source to power the area light 1010. The power outlets 1110 connect the area light 1010 to other devices to power those devices. For example, in some embodiments, the power outlets 1110 can connect to other area lights so that a series of area lights 1010 can be daisy-chained together to illuminate a larger area. In other embodiments, the power outlets 1110 can connect to power tools to power the power tools. The base 1018 also supports a power distribution circuit 1114 and any electrical components needed for the power distribution circuit 1114 (e.g., switches, transformers, heat sinks, a control system (including a processor, memory or other data storage, and an input/output interface), rectifiers, inverters, and the like).

The power distribution circuit 114 is arranged to control the distribution of electrical power to the lights and to or from any available battery packs 1118. The power distribution circuit 1114 is electrically connected to each of the battery slots 1116, the AC power input, the AC power output, and the LEDs to distribute power as required.

In the illustrated construction, the battery packs 1118 are power tool battery packs 1118 that are designed and manufactured for the purpose of powering power tools such as drills, saws, and the like. In preferred constructions, the battery packs 1118 are arranged to operate at 18 volts or higher. Each of the battery slots 1116 is arranged to receive one of the battery packs 1118 for use in supplying power to the area light 1010 or for recharging of the battery pack 1118.

The base 1018 further includes a control panel 1122 for controlling the operation of the area light 1010, as shown in FIG. 13. The control panel 1122 includes, among other things, a power button 1126, a light intensity control 1130, a light intensity indicator 1134, and a power source indicator 1138. The light intensity control 1130 allows a user to increase or decrease the intensity of the light. In the illustrated construction, there are three intensity settings when the area light 1010 is using DC power and six intensity settings when the area light 1010 is using AC power. The light intensity indicator 1134 includes a plurality of indicator bars 1142 that depict the level of intensity that the light is supplying. Additionally the indicator bars 1142 appear one color when the area light 1010 is using DC power and a different color when the area light 1010 is using AC power. The power source indicator 1138 includes a second set of indicator bars 1146 that depict the amount of power remaining in the DC power source.

In operation, the user first activates the light by depressing the power button 1126 or otherwise activating the area light 1010. If AC power is connected to the area light 1010 via the power inlet, the lights are activated and illuminated at the selected setting. In a preferred construction, the controller provides for a soft start feature for the lights. During a soft start, the level of illumination is slowly brought up to the selected level rather than immediately transitioning to the full illumination. The user can select any one of the six available illumination levels by depressing the illumination up or down buttons as required. The display includes a visual indication of the selected illumination level. In the illustrated construction, the visual indication includes six bars 1142 or lights with additional bars 1142 turning on as the level is increased. Of course, other constructions could employ different visual indicators.

If one or more battery packs 1118 are installed in the battery slots 1116, the controller will determine the level of charge for each of the battery packs 1118. In some constructions, a display is provided to illustrate the charge level of each of the battery packs 1118. If one or both of the battery packs 1118 require charging, power is delivered to the battery port to charge the battery packs 1118. The controller selects one of the ports to receive power until that battery pack 1118 is fully charged. Once charged, the controller will direct power to the other battery pack 1118 to complete the charging. Power is also available at the AC outlets if desired.

When no AC power is provided to the area light 1010, the area light 1010 will provide illumination using any available DC power from any attached battery packs 1118. The controller will determine the total power available from the battery pack 1118 or battery packs 1118 attached to the area light 1010. Based on this available power the controller may override the users selected illumination level to extend the duration that the light 1010 can operate. For example, if the controller determines that the level of power available will only power the light 1010 for one hour at the selected level, the controller may select one illumination lower to extend the operating time to something greater than one hour.

Although multiple battery packs 1118 can be inserted into the power distribution circuit 1114 at a given time, the illustrated area light 1010 only utilizes one battery pack 1118 at a time. The area light 1010 will utilize one battery pack 1118 until that battery pack 1118 has been fully drained of power. Then, the next battery pack 1118 will begin powering the area light 1010. In other words, the area light 1010 is configured to utilize the battery packs 1118 sequentially, one at a time.

Additionally, during operation the LEDs generate a large amount of excess heat. The heat is drawn from the LEDs into the heat sinks 1058 where the heat is dissipated. The arrangement of the main body 1050 further enhances the dissipation rate. Specifically, the vertical orientation of the heat sinks 1058 within the slots 1068 produces a chimney effect. As the air around each heat sink 1058 is heated, it naturally rises. The rising air draws additional cooler air into the slots 1068 via the slopping portion 1060 of the main body 1050. Thus, the arrangement produces a natural draft to increase the convention rate between the air and the heat sinks 1058.

It should be noted that any feature described with regard to one construction is equally applicable to any of the other constructions described herein.

Various features and advantages of the invention are set forth in the following claims.

What is claimed is:

1. A light comprising:

a housing having a bottom, a top, and a central axis extending through the bottom and the top, the housing including an upper portion and a lower portion, the lower portion defining a battery port;

a heat sink extending upward from the lower portion of the housing, the heat sink including a body defining a central aperture that extends along the central axis, a plurality of light support surfaces arranged around a perimeter of the body, and a top support member attached to tops of the plurality of light support surfaces;

one or more first LEDs coupled to the plurality of light support surfaces, the one or more first LEDs arranged to emit light in a 360 degree pattern;

one or more second LEDs supported on a surface of the top support member that is perpendicular to the plurality of light support surfaces; and a first loop and a second loop that are both disposed on the lower portion, the first loop and the second loop being spaced 180 degrees from each other about the central axis.

2. The light of claim 1, wherein the one or more first LEDs are supported on one or more circuit boards attached to the plurality of light support surfaces.

3. The light of claim 1, wherein the one or more second LEDs are arranged to emit light upward in a direction substantially parallel to the central axis.

4. The light of claim 1, further comprising a third loop, a fourth loop, a fifth loop, and a sixth loop, wherein each loop is spaced 60 degrees from each other about the central axis.

5. The light of claim 1, wherein the first loop and the second loop each include legs extending from the lower portion and tubes connected between the legs, and wherein the tubes are orientated perpendicular to the central axis.

6. The light of claim 1, wherein the first loop and the second loop are tubular shaped and usable as carrying handles when transporting the light.

7. The light of claim 1, wherein the first loop and the second loop extend outward from the lower portion of the housing.

8. The light of claim 1, further comprising a power input supported on the lower portion of the housing, the power input configured to connect to an external power source to power the one or more first LEDs and the one or more second LEDs.

9. The light of claim 1, further comprising a control panel supported by the lower portion of the housing, the control panel including a power button and a light intensity control.

10. A light comprising:

a housing including a first section having a first maximum outer dimension, a second section below the first section and having a second maximum outer dimension that is larger than the first maximum outer dimension, a third section below the second section and having a third maximum outer dimension that is larger than the second maximum outer dimension, and a central axis extending through the first section, the second section, and the third section;

a heat sink disposed within the first section of the housing;

a plurality of LEDs coupled to the heat sink and configured to emit light from the first section of the housing;

a control panel disposed on the second section of the housing, the control panel including a power button and a light intensity control; and a loop disposed on the third section of the housing.

11. The light of claim 10, wherein the heat sink includes a body having a plurality of light support surfaces arranged around a perimeter of the body, and a top support member attached to tops of the plurality of light support surfaces.

12. The light of claim 11, wherein the plurality of LEDs includes one or more first LEDs coupled to the plurality of light support surfaces and arranged to emit light in a 360 degree pattern.

13. The light of claim 12, wherein the plurality of LEDs also includes one or more second LEDs supported on a surface of the top support member that is perpendicular to the plurality of light support surfaces and arranged to emit light in a direction substantially parallel to the central axis.

14. The light of claim 10, wherein the loop includes legs extending from the third section of the housing and a tube connected between the legs, and wherein the tube is orientated perpendicular to the central axis.

15. The light of claim 10, wherein the loop is tubular shaped and usable as a carrying handle when transporting the light.

16. The light of claim 10, wherein the loop is one of a plurality of loops evenly spaced about the third section of the housing.

17. A light comprising:

a housing having a bottom, a top, and a central axis extending through the bottom and the top, the housing including an upper portion and a lower portion;

a heat sink extending upward from the lower portion of the housing;

a plurality of first LEDs coupled to the heat sink and arranged to emit light in a 360 degree pattern around the central axis;

one or more second LEDs supported on the heat sink and arranged to emit light in a direction parallel to the central axis;

a control panel supported by the lower portion of the housing, the control panel including a power control and an intensity control, the intensity control operable to change intensities of the plurality of first LEDs and the one or more second LEDs; and a first handle and a second handle that are both disposed on the lower portion, the first handle and the second handle being spaced 180 degrees from each other about the central axis.

18. The light of claim 17, wherein the first handle and the second handle are orientated perpendicular to the central axis.

19. The light of claim 17, wherein the first handle and the second handle are tubular shaped and usable as carrying handles when transporting the light.

20. The light of claim 17, wherein the first handle and the second handle extend outward from the lower portion of the housing.

* * * * *